(12) United States Patent
Yip et al.

(10) Patent No.: US 6,266,450 B1
(45) Date of Patent: Jul. 24, 2001

(54) ENCODING METHOD AND APPARATUS

(75) Inventors: Dominic Yip, Lindfield; Trevor Robert Elbourne, Fairlight; Hiren Patel, West Ryde, all of (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/161,769

(22) Filed: Sep. 29, 1998

(30) Foreign Application Priority Data

| Sep. 29, 1997 | (AU) | ................................ | PO 9516 |
| Sep. 29, 1997 | (AU) | ................................ | PO 9517 |
| Sep. 29, 1997 | (AU) | ................................ | PO 9518 |

(51) Int. Cl.$^7$ .................................................. G06K 9/36

(52) U.S. Cl. ............................ 382/240; 382/232; 706/13

(58) Field of Search ................................. 382/240, 238, 382/232; 709/225; 706/13

(56) References Cited

U.S. PATENT DOCUMENTS

| 4,464,650 | * | 8/1984 | Eastman et al. ........................ | 364/200 |
| 5,087,913 | * | 2/1992 | Eastman ................................. | 341/95 |
| 5,343,554 | * | 8/1994 | Koza et al. ............................. | 706/13 |
| 5,412,741 | * | 5/1995 | Shapiro ................................. | 382/232 |
| 5,734,833 | * | 3/1998 | Chiu et al. ........................... | 395/200.55 |
| 5,764,805 | * | 6/1998 | Martucci et al. ..................... | 382/238 |
| 6,041,053 | * | 3/2000 | Douceur et al. ...................... | 370/389 |
| 6,076,089 | * | 6/2000 | Fischer et al. ........................ | 707/102 |

FOREIGN PATENT DOCUMENTS

| 196 26 600 | 1/1997 | (DE) | ................................ | H04N/1/41 |
| 0855838 | 7/1998 | (EP) | ................................ | H04N/7/26 |

OTHER PUBLICATIONS

Baeza–Yates et al., "Fast Text Searching for Regular Expressions or Automation Searching on Tries", Journal of the ACM, vol. 43, No. 6, pp. 915–936, Nov. 1996.*

Bruce et al., "Wavelet Analysis," IEEE Spectrum, Oct. 1996, pp. 26–25.

I. Stollinitz et al., "Wavelet for Computer Graphics," 1996, pp. is–xiii and 1–5.

Shapiro, "Image Coding Using The Embedded Zerotree Wavelet Algorithm," Proc. of SPIE, vol. 2034, Jul. 15, 1993, pp. 180–193.

Said, et al., "A New, Fast and Efficient Image Codec Based on Set Partitioning In Hierarchial Trees," IEEE Trans. on Circuits and Systems For Video Tech., vol. 6, No. 3, Jun. 1, 1996, pp. 243–250.

\* cited by examiner

Primary Examiner—Jose L. Couso
Assistant Examiner—Anh Hong Do
(74) Attorney, Agent, or Firm—Fitzpatrick, Cella, Harper & Scinto

(57) ABSTRACT

An apparatus for the encoding of a series of wavelet coefficients of a predetermined size into a compact representation of the coefficients. The apparatus comprises a tree builder for constructing a tree form representation of the coefficients with leaf nodes representing coefficient values and internal nodes representing the number of bits needed to encode leaf nodes and child nodes of a current internal node. The tree builder stores the tree form representation in a tree buffer of the apparatus, and the tree buffer stores the tree form representation. A tree coder of the apparatus is interconnected to the tree buffer and adapted to read a current tree form representation and to output the encoding from the tree form representation. The tree buffer can include a component for storing at least two tree form representations and the tree builder can be adapted to form a first of the representations while the tree coder can be adapted to read a second of the tree form representations previously created by the tree builder.

24 Claims, 33 Drawing Sheets

| 33 (00100001) | 17 (00010001) | 4 (00000100) | 1 (00000001) |
| --- | --- | --- | --- |
| 8 (00001000) | 9 (00001001) | 3 (00000011) | 0 (000000000 |
| 2 (00000010) | 1 (00000001) | 1 (00000001) | 0 (00000000) |
| 1 (00000001) | 0 (00000000) | 0 (00000000) | 0 (00000000) |

| Bit Plane Level | Code Output | Coefficient Output | Item Number |
| --- | --- | --- | --- |
| 8 | 0 | | (2002) |
| 7 | 0 | | (2004) |
| 6 | 1 | 100001 | (2006) |
| | 0 | | (2008) |
| 5 | 1 | 10001 01000 01001 | (2010) |
| | 0 | | (2012) |
| 4 | 0 | | (2014) |
| 3 | 1 | | (2016) |
| | 1 | 100 001 011 000 | (2018) |
| 3 | 0 | | (2020) |
| 2 | 1 | 10 01 01 00 | (2022) |
| 3 | 0 | | (2024) |
| 2 | 0 | | (2026) |
| 1 | 1 | 1 0 0 0 | (2028) |

ENCODING METHOD AND APPARATUS

FIELD OF INVENTION

The present invention relates to the field of data compression and in particular, discloses an architecture for encoding coefficients that, have been constructed as a result of a compression process.

BACKGROUND OF THE INVENTION

The field of digital data compression and in particular digital image compression has attracted great interest for some time.

In the field of digital image compression, many different techniques have been utilised. In particular, one popular technique is the JPEG standard which utilises the discrete cosine transform to transform standard size blocks of an image into corresponding cosine components. In this respect, the higher frequency cosine components are heavily quantised so as to assist in obtaining substantial compression factors. The heavy quantisation is an example of a "lossy" technique of image compression. The JPEG standard also provides for the subsequent loss less compression of the transformed coefficients.

Recently, the field of wavelet transforms has gained great attention as an alternative form of data compression. The wavelet transform has been found to be highly suitable in representing data having discontinuities such as sharp edges. Such discontinuities are often present in image data or the like.

Although the preferred embodiments of the present invention will be described with reference to the compression of image data, it will be readily evident that the preferred embodiment is not limited thereto. For examples of the many different applications of Wavelet analysis to signals, reference is made to a survey article entitled "Wavelet Analysis" by Bruce et. al. appearing in IEEE Spectrum, October 1996 page 26–35. For a discussion of the different applications of wavelets in computer graphics, reference is made to "Wavelets for Computer Graphics", I. Stollinitz et. al. published 1996 by Morgan Kaufmann Publishers, Inc.

It would be desirable to provide an hardware embodiment of an encoder and method so as to provide for efficient and effective encoding of a series of wavelet coefficients in order to substantially increase the speed of encoding.

SUMMARY OF INVENTION

It is an object of the present invention to ameliorate one or more disadvantages of the prior art.

According to one aspect of the invention there is provided an apparatus for encoding a series of coefficients of a predetermined size into a compact representation of said coefficients, said apparatus including:

tree building means for constructing a tree representation of said coefficients with leaf nodes representing coefficient values and internal nodes representing the number of bits needed to encode leaf nodes and child nodes of a current internal node;

tree coding means for coding said constructed tree representation to produce a stream of data including said compact representation of said coefficients.

According to another aspect of the invention there is provided a method of encoding of a series of coefficients of a predetermined size into a compact representation of said coefficients, said method including:

constructing a tree representation of said coefficients with leaf nodes representing coefficient values and internal nodes representing the number of bits needed to encode leaf nodes and child nodes of a current internal node;

coding said constructed tree representation to produce a stream of data including said compact representation of said coefficients.

According to still another aspect of the invention there is provided a computer program product including a computer readable medium having recorded thereon a computer program for encoding of a series of coefficients of a predetermined size into a compact representation of said coefficients, said computer program product including:

tree building means for constructing a tree representation of said coefficients with leaf nodes representing coefficient values and internal nodes representing the number of bits needed to encode leaf nodes and child nodes of a current internal node;

tree coding means for coding said constructed tree representation to produce a stream of data including said compact representation of said coefficients.

According to another aspect of the invention there is provided an apparatus for the creation of an encoded bit stream from a series of coefficients including:

bit plane input means for inputting said series of coefficients;

a plurality of bit data validity units interconnected to said bit plane input means and to one another and adapted to filter said coefficient data into a predetermined number of groups and to further filter coefficients within each group into leading zero portions and non leading zero portions and to output said bit data in bit plane by bit plane portions and to further output signals indicative of said groupings;

packing logic means adapted to pack said encoded bit stream into a contiguous stream from said outputs of said bit data validity units.

According to still another aspect of the invention there is provided a method for the creation of an encoded bit stream from a series of coefficients, the method including the steps of:

inputting said series of coefficients;

grouping said coefficient data into a predetermined number of bitplanes;

grouping said coefficients within each group into leading zero portions and non leading portions;

outputting said series of coefficients in groups of bitplanes;

outputting data valid bits indicative of said groupings of said coeffcents within each group; and packing said series of coefficients using said data valid bits to produce said encoded bit stream.

According to another aspect of the invention there is provided a computer program product including a computer readable medium having recorded thereon a computer program for the creation of an encoded bit stream from a series of coefficients, the computer program product including:

input means for inputting said series of coefficients;

first group means for grouping said coefficient data into a predetermined number of bitplanes;

second group means for grouping said coefficients within each group into leading zero portions and non leading portions;

output means for outputting said series of coefficients in groups of bitplanes; output means for outputting data valid bits indicative of said groupings of said coefficients within each group; and packing means for packing said series of coefficients using the output data valid bits to produce said encoded bit stream.

According to still another aspect of the invention there is provided a method for the creation of an encoded bit stream from a series of coefficients, the including a coefficient stream, each of said coefficients being represented by a predetermined number of bits, said method including the steps of:

inputting said coefficients, a bit plane at a time;

determining from said bit plane a most significant bit of each of said coefficients;

storing those portions of said coefficients which are less than the most significant bit;

utilizing said most significant bit determination and said portions of said coefficients to encode a decodable interleaved compact form of said coefficient stream. including an interleaved coefficient magnitude portion stream and a coefficient portion stream.

According to still another aspect of the invention there is provided an apparatus for encoding a series of coefficients including:

input means for simultaneously inputting said series of coefficients, one bit plane at a time;

bit plane magnitude determination means interconnected to said input means for determining and storing a most significant bit of each of said coefficients;

coefficient storage means interconnected to said input means for storing the lesser significant coefficients of said coefficients;

pixel packer means interconnected to said bit plane magnitude determination means and said coefficient storage means and adapted to read values and to produce a decodable interleaved compact form of said coefficient stream including an interleaved coefficient magnitude portion stream and a coefficient portion stream.

According to still another aspect of the invention there is provided a computer program product including a computer readable medium having recorded thereon a computer program for encoding a series of coefficients including a coefficient stream, each of said coefficients being represented by a predetermined number of bits, said method computer program product including:

input means for inputting said coefficients, a bit plane at a time;

determination means for determining from said bit plane a most significant bit of each of said coefficients;

storage means for storing those portions of said coefficients which are less then the most significant bit; and encoding means utilizing said most significant bit determination and said portions of said coefficients to encode a decodable interleaved compact form of said coefficient stream including an interleaved coefficient magnitude portion stream and a coefficient portion stream

BRIEF DESCRIPTION OF THE DRAWINGS

Embodiments of the invention are described, by way of example only, with reference to the drawings, in which:

FIG. 17a illustrates a 4×4 block of pixels of the encoding method;

DETAILED DESCRIPTION

Figure 1:
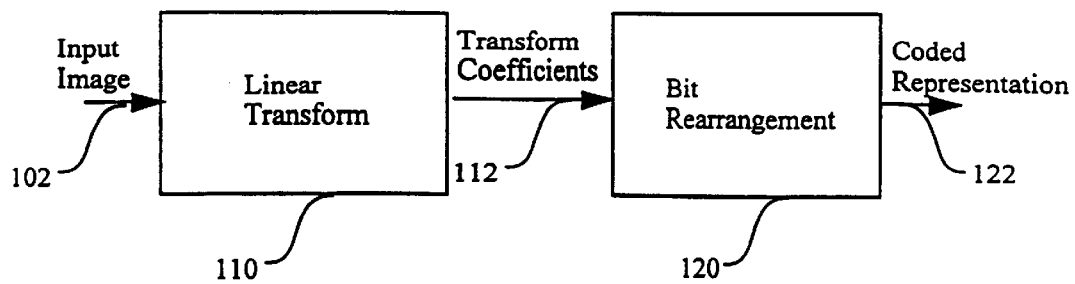
FIG. 1 is a high-level block diagram illustrating the image representation technique described in the herein-mentioned patent application.

Where reference is made in any one or more of the accompanying drawings to steps and/or features, which have the same reference numerals, those steps and/or features have for the purposes of this description the same function(s) and/or operation(s), unless the contrary intention appears.

Before proceeding with a description of the preferred embodiments, a description is given of the image compression and decompression method disclosed in Australian Provisional Patent Application No. PO 4728, entitled "A method for Digital Image Compression", filed on Jan. 22, 1997 by Canon Information Systems Research Australia Pty. Ltd. This method of compression and decompression is described in the following sections hereinafter entitled "1.0 Overview of SWEET Image Compression Method", "1.1 Encoding Process of First SWEET Image Compression Method", "1.2 Decoding Process of First SWEET Image Compression Method", "1.3 Two-Dimensional Example", and "1.4 Encoding Process of Second SWEET Image Compression Method".

1.0 Overview of SWEET Image Compression Method(s)

A high-level block diagram is illustrated in FIG. 1 to provide an overview of encoding method. An input image 102 is provided to the transform block 110, which is preferably a linear transform, to produce corresponding transform coefficients 112. A discrete wavelet transform (DWT) is preferably employed.

The two-dimensional DWT of an image is a transform that represents the image using a low frequency approximation to the image and three high frequency detail components. Conventionally, these components are termed subbands. Each of the four sub-images formed by the DWT is one quarter of the size of the original image. The low frequency image contains most of the information about the original image. This information, or energy compaction, is the feature of the discrete wavelet transform image subbands that is exploited for image compression.

The single-level DWT can be applied recursively to the low frequency image, or subband, an arbitrary number of times. For example, a three-level DWT of the image is obtained by applying the transform once and then applying the DWT to the low subband resulting from the transformation. Thus, this results in 9 detail subbands and one (very) low frequency subband. Even after three levels of DWTs, the resulting low frequency subband still contains a significant amount of information of the original image, yet is 64 times smaller (¼×¼×¼), thereby effecting a factor of 64 in compression.

However, other linear transformations for decorrelating image data may be practiced. For example, a discrete cosine transform (DCT) can be practiced. The transform coefficients 112, or more specifically the bit sequences representing their values, are then coded by the bit rearrangement block 120 in an efficient fashion to provide the coded representation 122.

The decoding process is simply the reverse of this encoding process. The encoded coefficients are decoded into the transform coefficients. The (transform domain) image is then inverse transformed to form the original image, or some approximation thereof.

Before proceeding with a further description of the embodiments, a brief review of terminology used hereinafter is provided. For a binary integer representation of a number, "bit n" or "bit number n" refers to the binary digit n places to the left of the least significant bit. For example, assuming an 8-bit binary representation, the decimal number 9 is represented as 00001001. In this number, bit 3 is equal to 1, while bits 2, 1, and 0 are equal to 0, 0, and 1, respectively. Furthermore, a transform may be represented as a matrix having coefficients arranged in rows and columns, with each coefficient represented by a bit sequence. Conceptually speaking the matrix may be regarded as having three dimensions; one dimension in the row direction; a second dimension in the column direction and a third dimension in the bit sequence direction. A plane in this three-dimensional space, which passes through each bit sequence at the same bitnumber, is called a bitplane or bit plane.

For transform coding applications, the number of bits per coefficient required to represent the possible range of coefficients is determined by the linear transform and the resolution of each pixel (in bits per pixel) in the input image. This range of values for each pixel is typically large relative to the values of most of the transform coefficients, and thus many coefficients have a large number of leading zeros. For example, the number 9 has four leading zeros in a 8-bit representation and has 12 leading zeros for a 16-bit representation. The compression method and apparatus represents (or codes) these leading zeros, for blocks of coefficients, in an efficient manner. The remaining bits and sign of the number are encoded directly without modification.

To simplify and the description, the transform coefficients are assumed hereinafter to be represented in an unsigned binary integer form, with a single sign bit. That is, the decimal numbers −9 and 9 are represented with the same bit sequence, namely 1001, with the former having a sign bit equal to 1 to indicate a negative value, and the latter having a sign bit equal to 0 to indicate a positive value. The number of leading zeros is determined by the range of the transform coefficients. In using an integer representation, the coefficients are implicitly already quantised to the nearest integer value, although this is not necessary. Further, for the purpose of compression, any information contained in fractional bits is normally ignored.

A region includes a set of contiguous image coefficients. The term coefficient is used hereinafter interchangeably with pixel, however, as will be well understood by a person skilled in the art, the former is typically used to refer to pixels in a transform domain (eg., a DWT domain).

1.1 Encoding Process of First SWEET Image Compression Method

Figure 3:
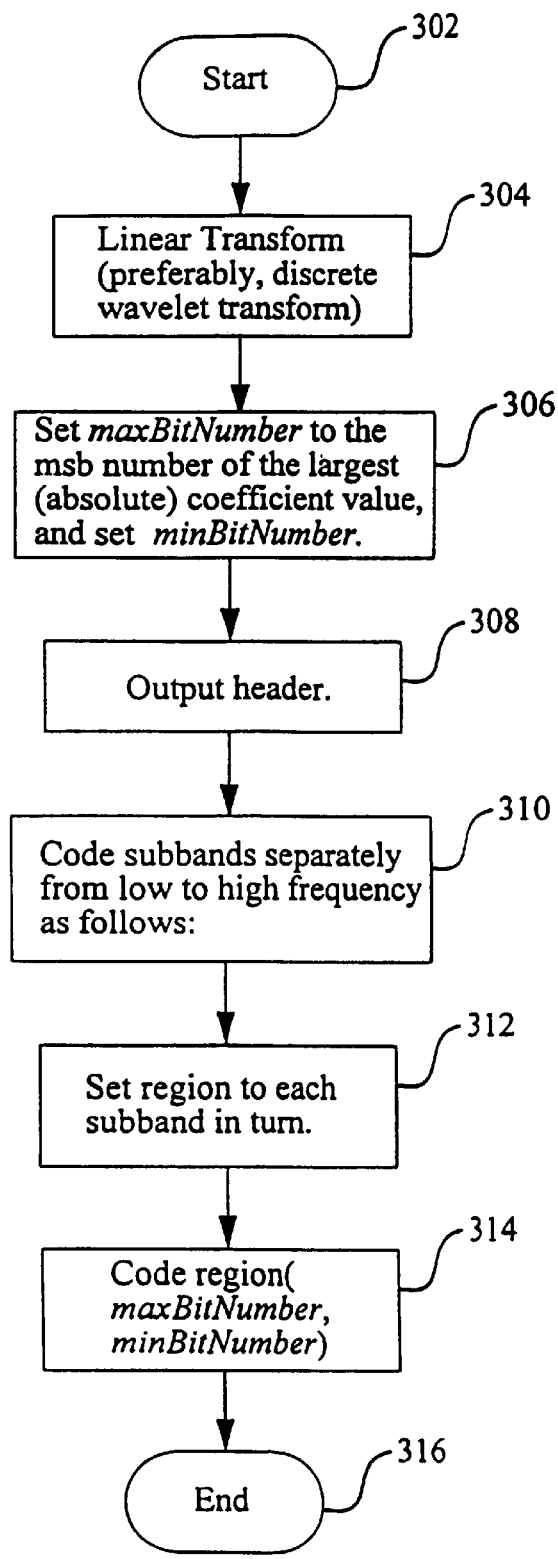
FIG. 3 is a flow diagram illustrating the method of representing, or encoding, an image described in the herein-mentioned patent application.
Figure 4:
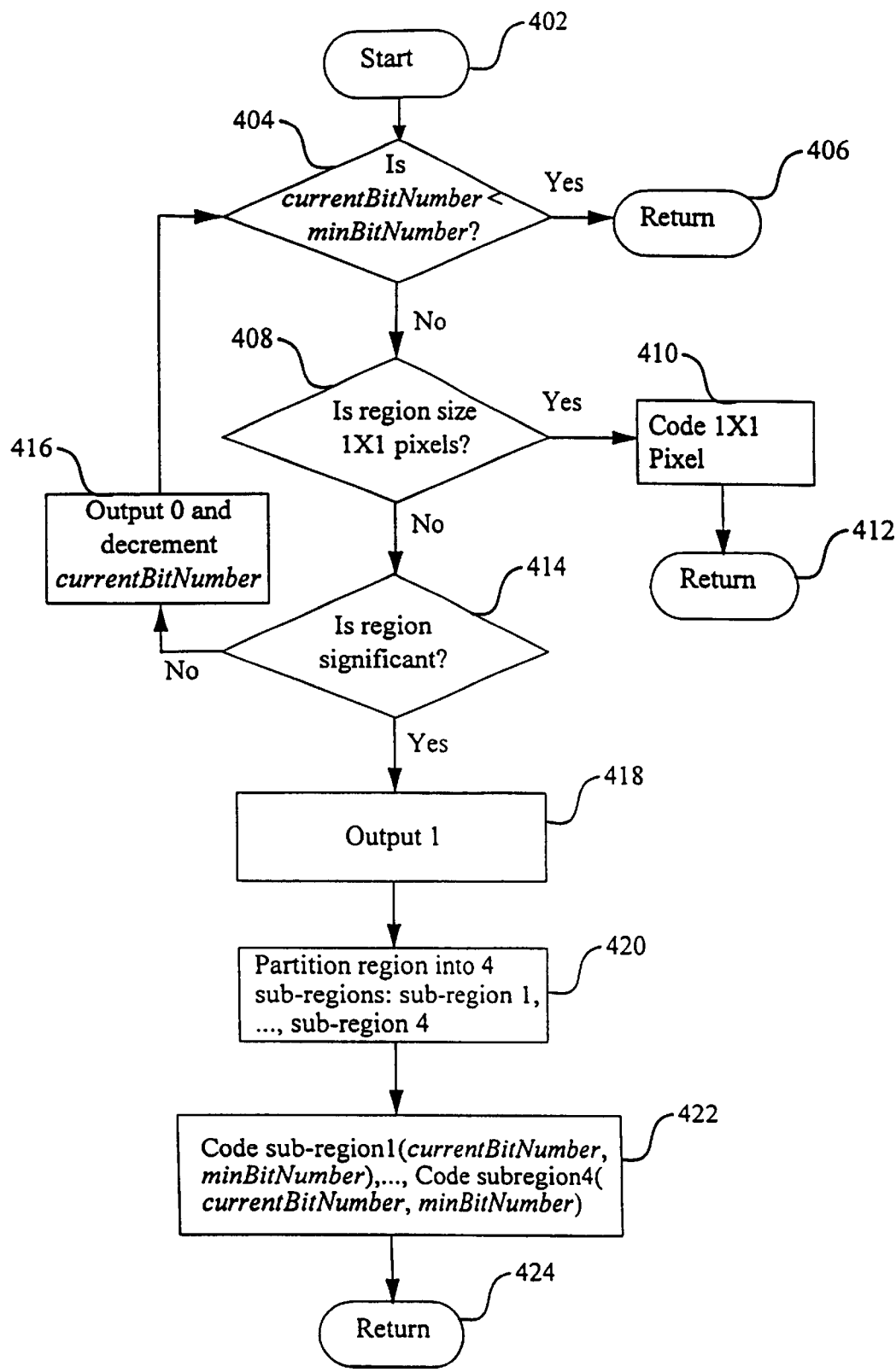
FIG. 4 is a detailed flow diagram illustrating the step of coding a region in FIG. 3.

A more detailed description of the first image compression method is provided with reference to FIGS. 3 and 4.

FIG. 3 is a flow diagram illustrating the first image encoding method. In step 302, processing commences using an input image. In step 304, the input image is transformed using a linear transformation, preferably a discrete wavelet transform. An initial region is defined to be the whole image. For example, in the case of a three-level DWT of the input image, the resulting coefficients consisting of the 10 subbands can be specified as the region. Alternatively each subband can be processed separately, setting each initial region to the whole subband in question.

In step 306, the most significant bit (msb) of the largest absolute value of the transform coefficients is determined and a parameter, maxBitNumber, is set to this coefficient value. For example, if the largest transform coefficient has a binary value of 00001001 (decimal 9), the parameter maxBitNumber is set to 3, since the msb is bit number 3. Alternatively, the parameter maxBitNumber may be set to be any value that is larger that the msb of the largest absolute value of the transform coefficients.

Further, in step 306, a coding parameter, minBitNumber is set to specify the coded image quality. In particular, this coding parameter specifies the precision of every coefficient in the transformed image and can be varied as required. For example, a minBitNumber of 3 provides a coarser reproduction of the original image than does a value of 1.

Optionally, the technique involves step 308, which provides an output header in the coded representation of the input image. Thus, in a practical implementation, header information is output as part of the coded representation. For example, the output header may contain information about the source image, including the image height and width, the number of levels of the DWT, the mean value of the DC subband, the maxBitNumber parameter, and the minBitNumber parameter.

Beginning in step 310, each subband of the transformed image is coded separately in steps 312 and 314. Each subband is coded independently, in order from low frequency to high frequency. For the DC subband, the mean value is removed prior to coding and coded into the header information in step 308. In step 312, each subband is coded by setting an initial region as the whole subband. In step 314, the region is encoded with the maxBitNumber and minBitNumber as parameters. This provides a hierarchical code, since lower resolution versions of the image are coded into the bit stream before higher resolutions. Processing terminates in step 316.

FIG. 4 is a detailed flow diagram of the procedure "Code region(currentBitNumber, minBitNumber)" called in step 314 of FIG. 3 for coding each region, where maxBitNumber is provided as the currentBitNumber. In step 402, processing commences. The inputs to the region coding process of FIG. 4 include the currentBitNumber and minBitNumber parameters. Preferably, the method is implemented as a recursive technique where the process is able to call itself with a selected region or sub-region. However, the process may implemented in a non-recursive manner.

In decision block 404, a check is made to determine if the currentBitNumber parameter is less than the minBitNumber parameter. Otherwise, if decision block 404 returns true (yes), nothing is done and processing returns to the calling procedure in step 406. This condition indicates that every coefficient in the selected region has a msb number less than minBitNumber. If decision block 404 returns false (no), processing continues at decision block 408.

In decision block 408, a check is made to determine if the selected region is a 1×1 pixel. If decision block 408 returns true (yes), processing continues at step 410. In step 410, the 1×1 pixel is coded. Preferably, this involves directly outputting the remaining bits above the minBitNumber in the coded representation. In step 412, processing returns to the calling procedure. Otherwise, if decision block 408 returns false (no), the region consists of more than one coefficient and processing continues at decision block 414.

In decision block 414, the selected region is checked to determine if it is significant. That is, the significance of the region is tested. The region is said to be insignificant if the msb number of each coefficient in the region is less than the value of the currentBitNumber parameter. To make the concept of region significance precise, a mathematical definition is given in Equation (1). At a given bit number, say currentBitNumber=n, the region is said to be insignificant if:

$$|c_{ij}|<2^n, \forall i, j \in R, \qquad (1)$$

where R denotes the region, and $c_{ij}$ denotes coefficient (i,j) in this region.

If decision block 414 returns false (no), processing continues at step 416. In step 416, a value of 0 (or first token) is output in the coded representation stream, and the currentBitNumber parameter is decremented by 1. That is, the next, lower bitplane of the region is selected for processing. Processing then continues at decision block 404, where the region is again processed with the parameters currentBitNumber-1 and minBitNumber. Otherwise, if decision block 414 returns true (yes), that is, the region is significant, processing continues at step 418.

In step 418, a value of 1 (or second token) is output in the coded representation stream. In step 420, the selected region is partitioned into a predetermined number (preferably, 4) of subregions using a specified partitioning algorithm. The partitioning algorithm used is known to the decoder.

Figure 2:
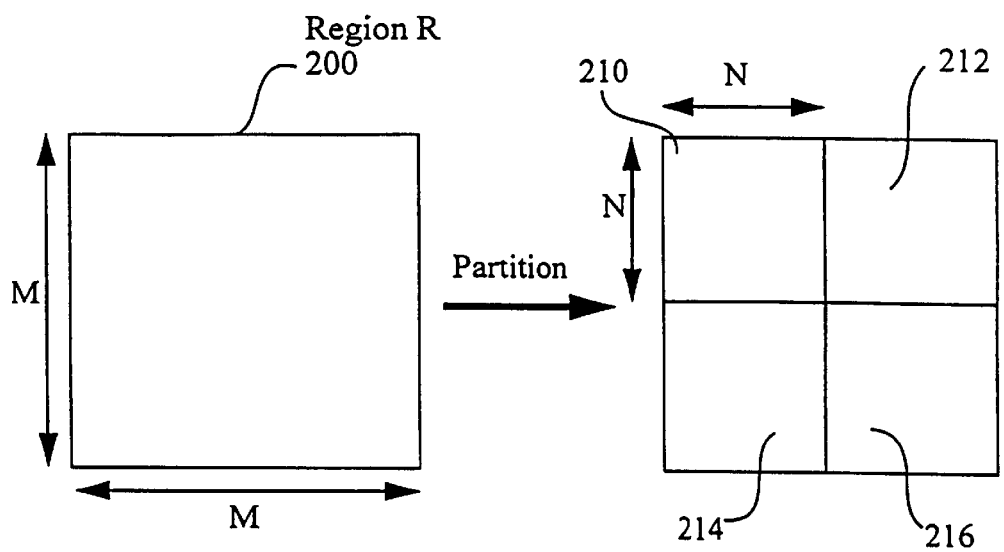
FIG. 2 is a diagram illustrating partitioning described in the herein-mentioned patent application.

In this method, square regions are used. A region is partitioned preferably into 4 equal-sized (square) subregions. As shown in FIG. 2, the selected region (R) 200 has a size of M×M coefficients and is partitioned into four equal-sized subregions 210, 212, 214 and 216. Each of the subregions has a size of N×N, where N is equal to M/2. This is not always possible depending on the size and shape of the initial region. If this is not possible, the initial region can be partitioned into a number of square regions, each having dimensions that are a power of 2, and encode these partitions separately. In any case, this initialization has minimal effect on the overall results if done in an intelligent fashion. Alternatively, a different partition may be used that is suitable for a block-based coder.

In step 422, each subregion is then coded with the same currentBitNumber and minBitNumber parameters. This is preferably done by means of a recursive call to the procedure "Code region(currentBitNumber, minBitNumber)" of FIG. 4. This coding of subregions may be implemented in parallel or sequentially. In the latter case, the processing may commence from a low frequency subband to higher frequency subbands in turn.

In the coded representation, a transform coefficient is coded by simply outputting the pixel bits from the currentBitNumber to the minBitNumber. Preferably, a convention is followed whereby the sign is output only if some of the coefficient bits were non-zero. For example, if currentBitNumber=3, minBitNumber=1, then −9 (00001001) is coded as "1 0 0" followed by a sign bit "1".

1.2 Decoding Process of First SWEET Image Compression Method

Figure 5:
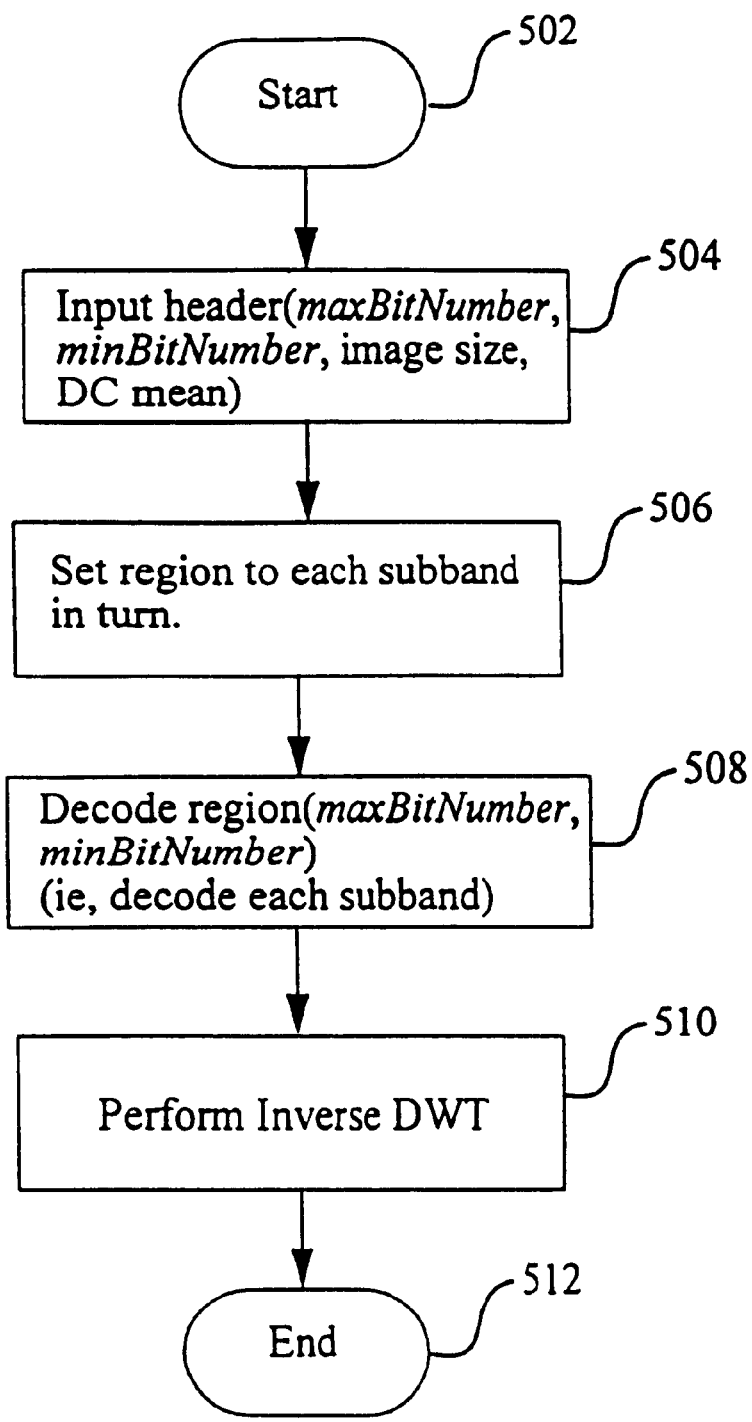
FIG. 5 is a flow diagram illustrating the method of decoding a coded representation of an image produced in accordance with the method FIG. 3.

FIG. 5 is a flow diagram illustrating a method of decoding the coded representation of an image obtained using the process of FIGS. 3 and 4. In step 502, processing commences using the coded representation. In step 504, the header information is read from the coded representation to determine the size of the original image, and hence the initial region size. Also, information such as maxBitNumber (equal to the initial currentBitNumber in the coding process) and minBitNumber are input. Further information includes the mean value of the DC subband.

In step 506, decoding of each subband is commenced by setting the region to the respective subbands in turn. In step 508, the selected region is decoded using the maxBitNumber and minBitNumber parameters. In 510, the inverse DWT is applied to the decoded selected region. Processing terminates in step 512.

Figure 6:
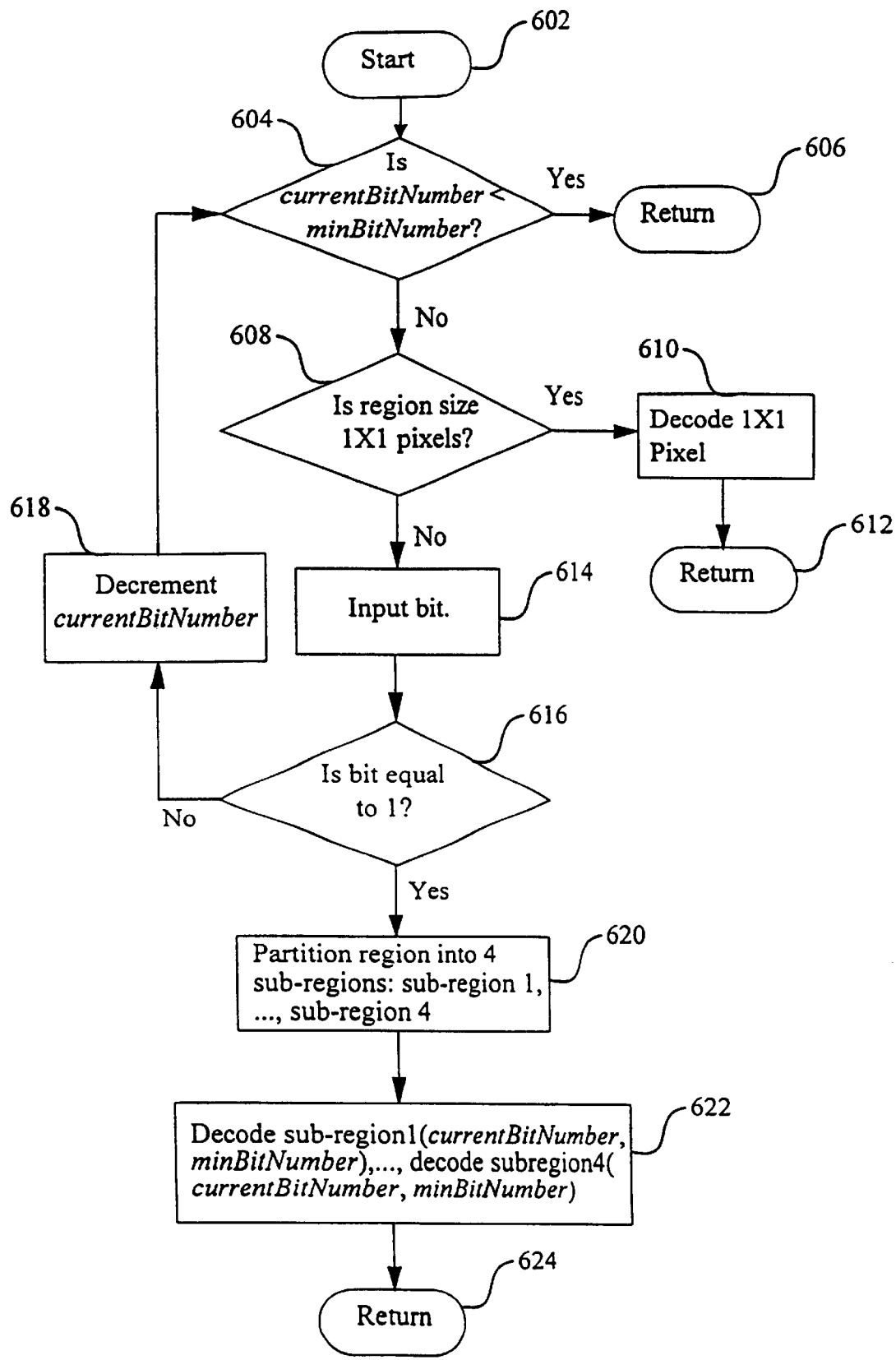
FIG. 6 is a detailed flow diagram illustrating the step of decoding a region in FIG. 5.

FIG. 6 is a detailed flow diagram of step 508 of FIG. 5 for decoding each region using procedure call "Decode region (currentBitNumber, minBitNumber)", where maxBitNumber is provided as the currentBitNumber. In step 602, processing commences. The inputs to the region decoding process of FIG. 6 are the currentBitNumber and minBitNumber parameters. Again, the method is preferably implemented as a recursive technique. However, the process can be implemented in a non-recursive manner.

In decision block 64, a check is made to determine if the currentBitNumber is less then the minBitNumber. If decision block 604 returns true (yes), processing continues at step 606, where processing returns to the calling procedure. Otherwise, if decision block 604 returns false (no), processing continues at decision block 68.

In decision block 608, a check is made to determine if the selected region has a size of 1×1 pixels. If decision block 608 returns true (yes), processing continues at step 610. In step 610, the 1×1 region is decoded. Processing then returns to the calling procedure in step 612. If decision block 608 returns false (no), processing continues at step 614. In step 614, a bit is input from the coded representation.

In decision block 616, a check is made to determine if the bit is equal to 1, that is, the input is checked to determine if the region is significant. If decision block 616 returns false (no), processing continues at step 618, the currentBitNumber is decremented, and processing continues at decision block 64. Otherwise, if decision block 616 returns true (yes), processing continues at step 620. In step 620, the region is partitioned into the predetermined number (preferably, 4) of sub-regions. In step 622, each of the sub-regions is decoded using the currentBitNumber and minBitNumber. This is carried out by means of a recursive call to the process illustrated in FIG. 6. In step 624, processing returns to the calling procedure.

Thus, the bits output from the significance decisions in the encoder instruct the decoder on which path of the algorithm to take, thus mimicking the encoder. The pixels, and possible sign, are decoded by simply reading in the appropriate number of bits (currentBitNumber to minBitNumber and if some of these are non-zero the sign bit).

1.3 Two-Dimensional Example

The method effectively codes the leading zeros of most transform coefficients, while coding the bits from the most significant bit to the predetermined least significant bit, specified by the parameter minBitNumber, and the sign simply as is. Thus, the compression method advantageously represents the leading zeros. This method is very efficient in certain situations, namely for coding discrete wavelet transform image coefficients, which typically exhibit a large dynamic range.

A few coefficients typically have very large values, while most have very small values.

Figures 7A, 7B, 7C, 7D:
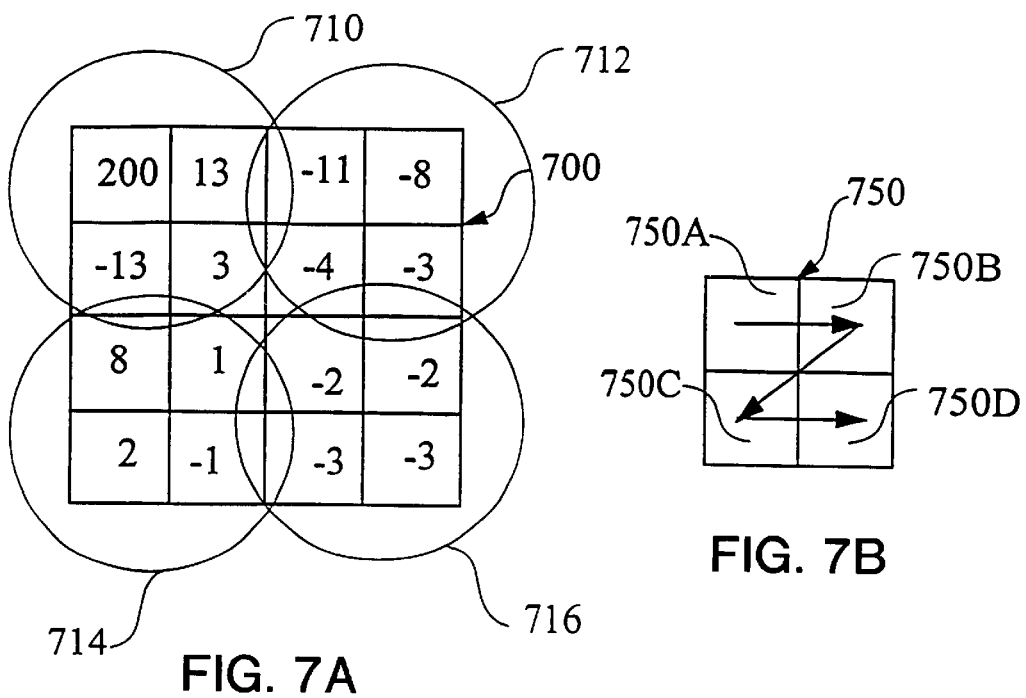
FIGS. 7A to 7D are diagrams illustrating the processing of a two-dimensional, eight-coefficient region in accordance with the encoding and decoding method of FIGS. 3 to 6.

An example of encoding a two-dimensional region including 4×4 coefficients is described with reference to FIGS. 7A to 7D. The processing of the 4×4 region 700 of FIG. 7A is commenced with the maxBitNumber set to 7 since this is the largest bit number (bitplane) of all of the coefficients:

$$\begin{bmatrix} 200 & 13 & -11 & -8 \\ -13 & 3 & -4 & -3 \\ 8 & 1 & -2 & -2 \\ 2 & -1 & -3 & -3 \end{bmatrix}.$$

The minBitNumber is set to 3, for illustrative purposes. A header is preferably output in the coded representation containing the maxBitNumber and minBitNumber. The process of coding the region 700 then follows.

At currentBitNumber=7, a one (1) is output since the region 700 is significant with respect to bit number 7(see decision block 404, 408, and 414 and step 418 of FIG. 4). The region 700 is then partitioned into four sub-regions (see step 420 of FIG. 4): the top left region 710, the top right region 712, the bottom left region 714 and the bottom right region 716 of FIG. 7A. Each of the subregions consist of 2×2 coefficients.

The sub-regions 710, 712, 714 and 716 of FIG. 7A are in turn coded in the predefined processing sequence shown of FIG. 7B, where a region 750 consists of four sub-regions 750A to 750D. The three arrows illustrated in the diagram indicate the order or sequence of processing, that is, top left sub-region 750A, top right sub-region 750B, bottom left sub-region 750C, and bottom right sub-region 750D, respectively.

The sub-region 710 of FIG. 7A is coded first (see step 422 of FIG. 4). For the currentBitNumber equal to 7, a one (1) is output in the coded representation. The sub-region 710 is then partitioned into four 1×1 pixels having decimal values 200, 13, −13 and 3. Each of these coefficients is coded by outputting the bits of each coefficient from the currentBitNumber=7 to the minBitNumber=3 (see decision block 408 and step 410 of FIG. 4). A sign bit is then output if required. Thus, the decimal value is 200 is coded as 11001 followed by the sign bit 0. The coefficient value 13 is coded as 00001 with a sign bit 0. The coefficient value −13 is coded as 00001 with a sign bit 1. Finally, the coefficient value 3 is coded as 00000 (without a sign bit). The coded representation of each coefficient includes the two "1" bits preceding the bits of coefficients "200" between the currentBitNumber and minBitNumber. This completes the coding of the top left sub-region 710. The coded output at this state is:

$$\underset{200}{11\underline{11001}} \; \overset{\text{sign bit}}{\hat{0}} \; \underset{13 \quad -13 \quad 3}{\underline{00001}\underline{00001}\underline{1}00000}.$$

The header information is not shown in the foregoing expression.

The top right sub-region 712 is then coded (per FIG. 7B). A zero (0) is output for each of currentBitNumber equal to 7, 6, 5, and 4, since the region 712 is insignificant with respect to these bit numbers. A one (1) is output at currentBitNumber=3, since this bitplane is significant with respect to bit number 3. The sub-region 712 is partitioned into the four 1×1 pixels having values −11, −8, −4 and −3. These decimal values are coded as bit value 1 with sign bit 1, bit value 1 with sign bit 1 and bit values 0 and 0 without sign bits, respectively. Thus, at this stage, the coded representation is as follows:

$$1111001000001000001100000000001 \; \underset{-11}{\underline{11}} \; \underset{-8}{\underline{11}} \; \underset{-4}{\underline{0}} \; \underset{-3}{\underline{0}}$$

The bottom left sub-region 714 is then encoded. A zero (0) is output for each of currentBitNumber equal to 7, 6, 5, and 4, since the region 714 is insignificant with respect to these bit numbers. A one (1) is output at currentBitNumber equal to 3, since this bitplane is significant with respect to bit number 3. The sub-region 714 is then partitioned into four 1×1 pixels having values 8, 1, 2 and −1. These are coded respectively as binary value 1 with sign bit 0, and binary values 0, 0 and 0 without sign bits.

Finally, the bottom right sub-region 716 having values −2, −2, −3, and −3 is coded.

A zero (0) is output for each of currentBitNumber=7, 6, 5, 4 and 3 since the sub-region 716 is insignificant with respect to these bit numbers. No sign bits are output. Thus, the coded representation is as follows:

11110010000010000011000000000111110000001100000000.

The decoder simply mimics the encoding process to reconstruct the region from the coded representation as depicted in FIG. 7C.

The decoding process can be made "smarter" in a number of ways. One such a "smarter" way is depicted in FIG. 7D. In this case, the magnitude of the non-zero coefficients is each increased by half of 2 to the power of minBitNumber. This is depicted in FIG. 7D. In this manner, the "smart" decoding processing generally reduces the mean square error between the decoded and the original coefficients. Still further, the encoder can alternatively perform this (type of) operation, thereby leaving the decoder to use the simplest depicted in FIG. 7C.

1.4 Encoding Process of Second SWEET Image Compression Method

A coding process according to an alternate method is hereinafter described with reference to FIGS. 9 to 12.

A discrete wavelet transform of an entire digital image can be performed on a block-by-block basis. The result of the transformation upon each block is a set of coefficients, which are essentially equivalent to a set of spatially corresponding coefficients of a discrete wavelet transform of the entire image. For example, from a predetermined set of coefficients of a DWT for an entire image, a portion or block of the digital image can be reproduced to a specified detail. Selecting the predetermined set of coefficients from the frequency domain amounts substantially to representing the corresponding portion of a digital image (the block) from the spatial domain. A block based DWT of a digital image can be performed by decomposing an image into a plurality of blocks and applying the transform to each block independently, thereby substantially evaluating those DWT coefficients relevant to the current spatial location. The advantage of adopting a block-based transform approach is that a block can be subsequently encoded with minimal interaction (substantially independent) from another block of the image. Block-based techniques are inherently memory localized and therefore are generally efficient when implemented using computer systems.

Figure 9:
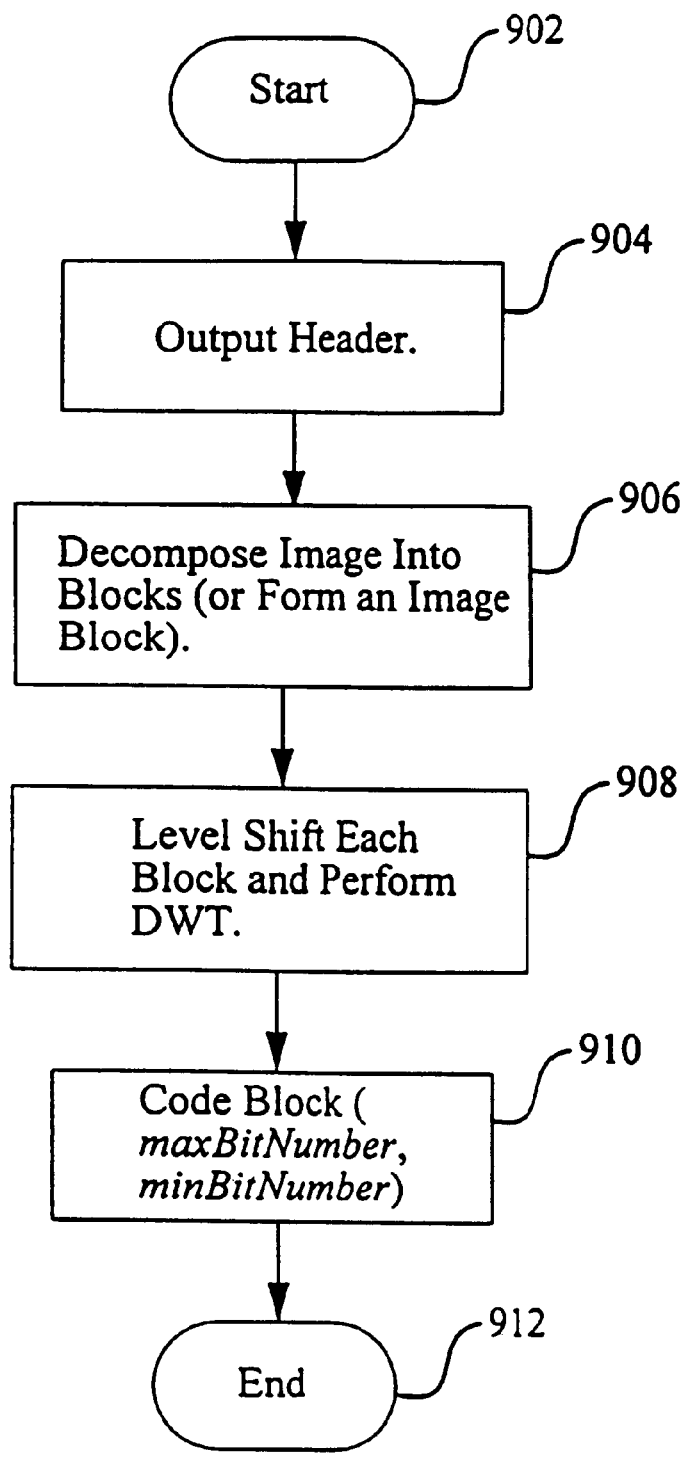
FIGS. 9 to 12 are flow diagrams illustrating an alternate method representing, or encoding, an image described in the herein-mentioned patent application.

FIG. 9 is a flow diagram illustrating the block-based encoding process according to the second encoding method. Processing commences at step 902. In step 904, a header is output. This information preferably includes the image height and width, the block size, the number of levels of the DWT, and two coding parameters maxBitNumber and minBitNumber. Optionally, more or less header information may be used depending upon the application.

The coding parameter maxBitNumber can be selected in a variety of ways. If the block DWT is performed on all image blocks prior to coding of any of them, the maxBitNumber can be chosen to be the MSB number of the largest coefficient across all DWT blocks. For example, if the largest coefficient is 10000001 (decimal value 129), the maxBitNumber is set to 7 since the MSB is bit number 7. Alternatively, a deterministic bound can be used which is determined by the transform and the resolution of the input image. For example, with an 8-bit input image (level shifted to 7-bits plus sign) and the Haar transform, the largest MSB is bounded by J+7 where J is the number of levels of the DWT. If the blocks are small, the selection of this parameter can have a significant effect on compression. In some instances, more sophisticated ways of selecting maxBitNumber may be employed. However, this depends upon the specific application.

The parameter minBitNumber determines the compression ratio versus quality trade off and can be varied. For example, for nearly orthogonal transforms, a value of 3 provides adequate image quality for 8-bit, grey-scale or 24-bit, RGB images.

In step 906, the image is decomposed into blocks (or an image block is formed). The image is decomposed preferably into overlapping blocks. However, non-overlapping blocks may be employed. The block of coefficients can be as large as the whole original image, or as small as a block of 8×8 coefficients (for a three-level transform). For low memory applications, a block that is as small as possible may be employed. Generally, a block size of 16 coefficients is sufficient for higher levels of compression with a three or four level DWT. A block size of 8×8 coefficients with a three-level DWT can maintain good coding efficiency by employing differential pulse code modulation (DPCM) on the DC coefficient of each block.

In step 908, each block is level shifted and the transform is performed. Preferably, a DWT is employed. The image values are level shifted (for example, by 128 for an 8-bit image) to reduce or eliminate any undue mean bias, and each spatial block of the image is transformed. For a DWT, usually some knowledge of the block surrounding the current block is needed (and similarly for the inverse DWT), although this is not strictly required.

In step 910, the block is coded using the maxBitNumber and minBitNumber parameters. Processing terminates in step 912.

Figure 10:
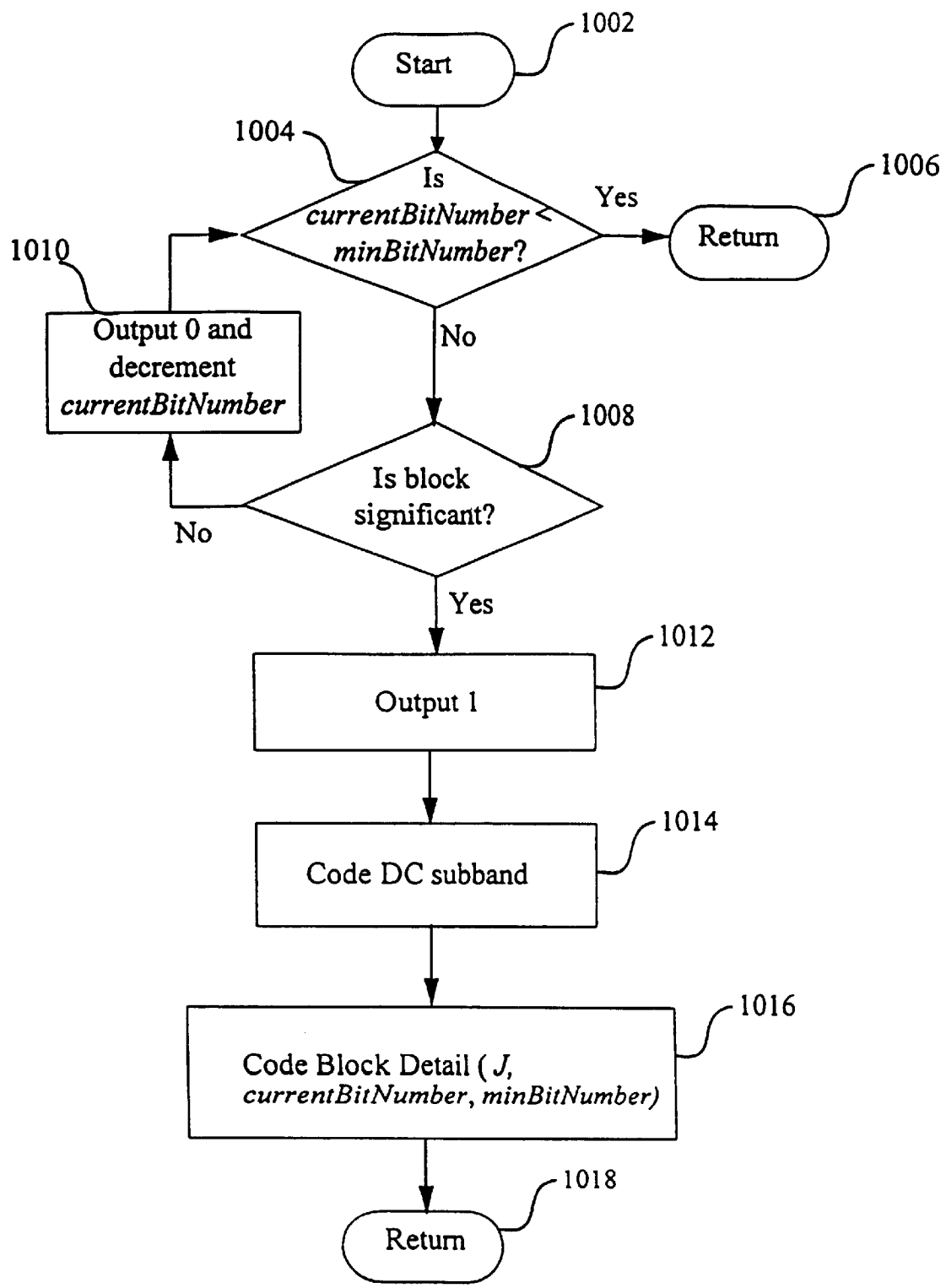

Step 910 for coding a block is illustrated in detail in the flow diagram of FIG. 10. The inputs to the block coding process of FIG. 10 include the currentBitNumber and the minBitNumber parameters. With reference to step 910 of FIG. 9, the maxBitNumber is input as the currentBitNumber parameter. Processing commences in step 1002. In decision block 1004, a check is made to determine if the currentBitNumber is less than the minBitNumber. If decision block 1004 returns true (yes), processing continues at step 1006. In step 1006, execution returns to the calling process, thereby indicating that every coefficient in the block has an MSB number less than the minBitNumber. Otherwise, if decision block 1004 returns false (no), processing continues at decision block 1008.

In decision block 1008, a check is made to determine if a current block is significant. If decision block 1008 returns false (no), processing continues at step 1010. In step 1010, a zero (0) is output in the coded representation and the currentBitNumber is decremented, that is, the next lower bit plane is selected. Processing then continues at decision block 1004. Otherwise, if decision block 1008 returns true (yes) processing continues at step 1012.

Decision blocks 1004 and 1008 along with step 1010 enable the process to find the MSB number of the largest coefficient in the block. A block is insignificant with respect to the currentBitNumber if the MSB number of every coefficient in the block is less than the currentBitNumber. This is repeated until the bitplane of the block is significant or the currentBitNumber is less than the minBitNumber.

In step 1012, a one (1) is output in the coded representation to indicate the bitplane is significant. In step 1014, the DC subband is coded. In step 1016, the block detail is coded using the parameters J, currentBitNumber and minBitNumber. In step 1018, execution returns to the calling procedure. Thus, given that the block is significant, steps 1012, 1014 and 1016 are carried out to use the (generalized) quadtree segmentation to find all coefficients with an MSB number greater than the minBitNumber. If the block is significant, it is partitioned into two "sub-blocks": the DC subband coefficients and the block consisting of the remaining coefficients, referred to as the "block detail" for level J since it represents the high frequency information about the block of level J at all lower levels.

Figure 12:
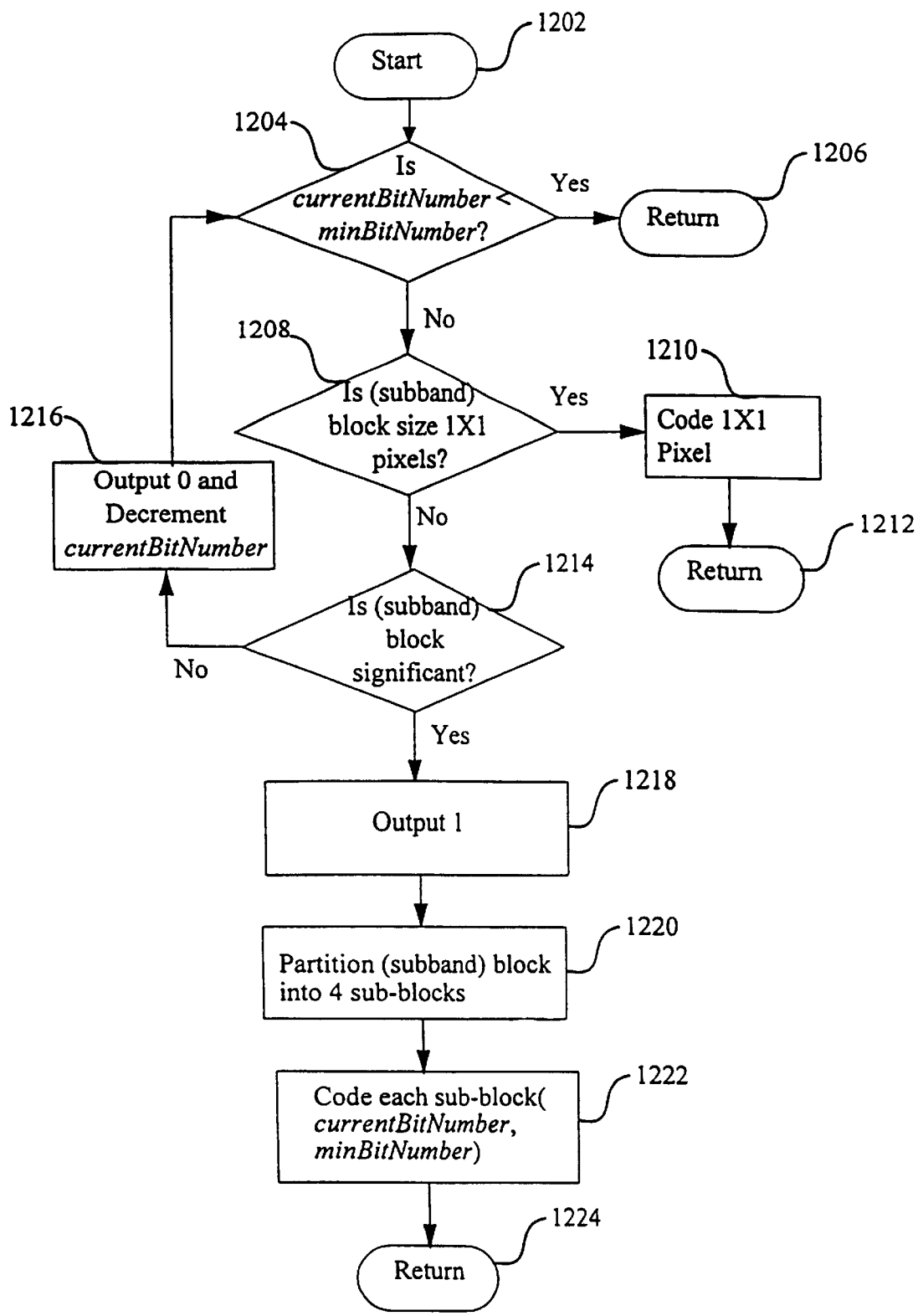

Step 1014 of FIG. 10 for coding the DC subband is illustrated in detail by the flow diagram of FIG. 12. That is, FIG. 12 shows the process of coding a subband or sub-block using currentBitNumber and minBitNumber parameters. In step 1202, processing commences. In decision block 1204, a check is made to determine if the currentBitNumber is less than the minBitNumber. If decision block 1204 returns true (yes), processing continues at step 1206. In step 1206, execution returns to the calling procedure. Otherwise, if decision block 1204 returns false (no), processing continues at decision block 1208.

In decision block 1208 a check is made to determine if the (subband) block size is 1×1 pixels. If decision block 1208 returns true (yes), processing continues at step 1210. In step 1210, the 1×1 pixel is coded. This involves outputting the bits between the currentBitNumber and the minBitNumber, inclusive, followed by a sign bit if necessary. Processing then returns to the calling procedure in step 1212. Otherwise, if decision block 1208 returns false (no), processing continues at decision block 1214.

In decision block 1214, a check is made to determine if the (subband) block is significant. If decision block 1214 returns false (no), processing continues at step 1216. In step 1216, a zero (0) is output in the coded representation and the currentBitNumber is decremented. Processing then continues at decision block 1204. Otherwise, if decision block 1214 returns true (yes), processing continues at step 1218.

In step 1218, a one (1) is output in the coded representation to indicate that the (subband) block is significant. In step 1220, the (subband) block is partitioned into four sub-blocks. In step 1222, each sub-block is coded using the parameters currentBitNumber and minBitNumber, by means of a recursive call to the process of FIG. 12. In step 1224, execution returns the calling procedure.

Thus, in the process of FIG. 12, a subband or sub-block thereof is coded. The largest MSB number is isolated as before. If the sub-block consists of only one pixel, it is coded as a single coefficient. Otherwise, the currentBitNumber is decremented and a zero (0) is output in the coded representation until the currentBitNumber is less than the minBitNumber, or the subband (sub-block) is significant. If the subband (sub-block) is significant, it is partitioned into four (as close to equal as possible) sub-block, and these are coded in turn. A single coefficient, for example the DC coefficient, is encoded by outputting the coefficient bits from the currentBitNumber to the minBitNumber. Again, the sign is preferably only output if some of the coefficient bits are non-zero.

Figure 11:
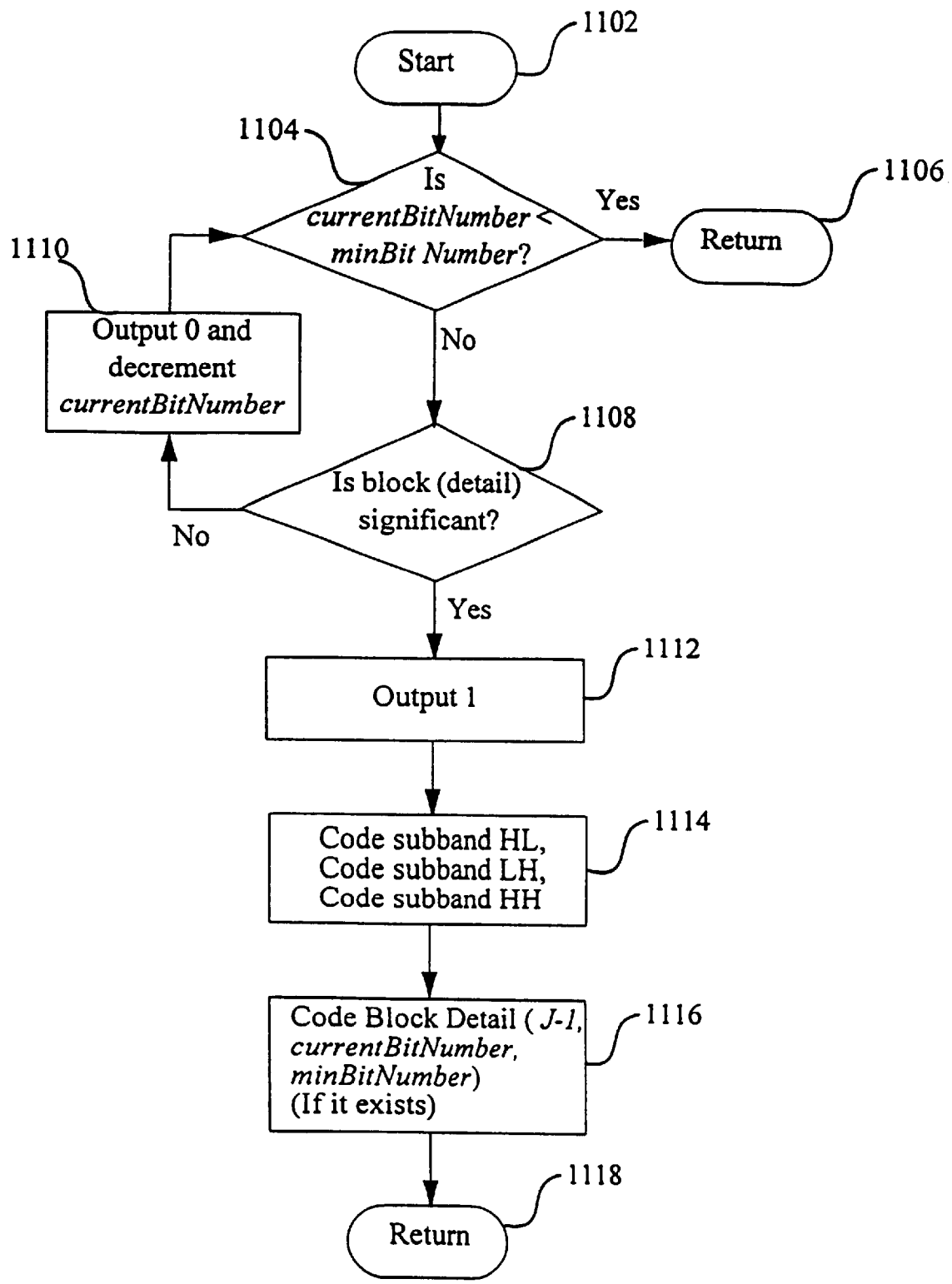

Step 1016 of FIG. 10 for coding block detail is illustrated by the flow diagram of FIG. 11. In step 1102, processing commences. In decision block 1104, a check is made to determine if the currentBitNumber is less than the minBit-Number. If decision block 1104 returns true (yes), execution returns to the calling procedure in step 1106. Otherwise, if decision block 1104 returns false (no), processing continues at decision block 1108.

In decision block 1108, a check is made to determine if the block (detail) is significant. If decision block 1108 returns false (no), processing continues at step 1110. In step 1110, a zero (0) is output in the coded representation and the currentBitNumber is decremented. Processing then continues at decision block 1104. Otherwise, if decision block 1108 returns true (yes), processing continues at step 1112.

In step 1112, a one (1) is output in the coded representation to indicate that the block (detail) is significant. In step 1114, each of the high-low (HL), low-high (LH), and high-high (HH) frequency subbands is coded. The HL, LH, and HH frequency subbands of each resolution are commonly referred to as AC subbands. Each of these subbands is coded in accordance with the process of FIG. 12. In step 1116, the block detail is coded using the parameters J-1, currentBit-Number and minBitNumber (if the block detail exists) by means of a recursive call to the process illustrated in FIG. 11. Execution returns to the calling procedure in step 1118.

Thus, the block detail for level J is processed to first isolate the MSB number of the largest coefficient. This is done by decrementing the currentBitNumber and outputting zeros until the block is significant. The block is then partitioned into the three high frequency subbands at level J and the block detail for level J-1 (if J-1 is greater than 0). This partitioning approach is motivated by the so-called 1/f type spectral models.

The decoding process for the second method can be implemented by mimicking the coding process described with reference to FIGS. 9 to 12.

The encoding and decoding methods and apparatuses represent digital image data in an efficient and flexible manner, in which the representation is suitable for storing and/or transmitting images. The encoding techniques can be used generally to represent an array of transform coefficients, and to provide an efficient representation by representing an image in the discrete wavelet transform domain. In particular, the methods and apparatuses represent (or code) leading zeros of blocks of transform coefficients obtained from an input image. The techniques are efficient in terms of offering a good reproduction of the original image for a given size code and offering fast decoding. Further, the techniques are flexible in that coefficients obtained from a linear transformation are encoded independently without the use of entropy coding. The advantageous aspects of the methods include the depth first nature of the coding. Further, in the case of coding subbands, the advantageous aspects of the method include hierarchical coding of each subband separately.

2. Preferred Embodiment(s) of Apparatus and Method

The preferred embodiments of the apparatus and method provide for efficient and effective encoding to produce the coded output of the image compression methods described above.

2.1 Preferred Embodiment(s) of Apparatus and Method

Figure 13:
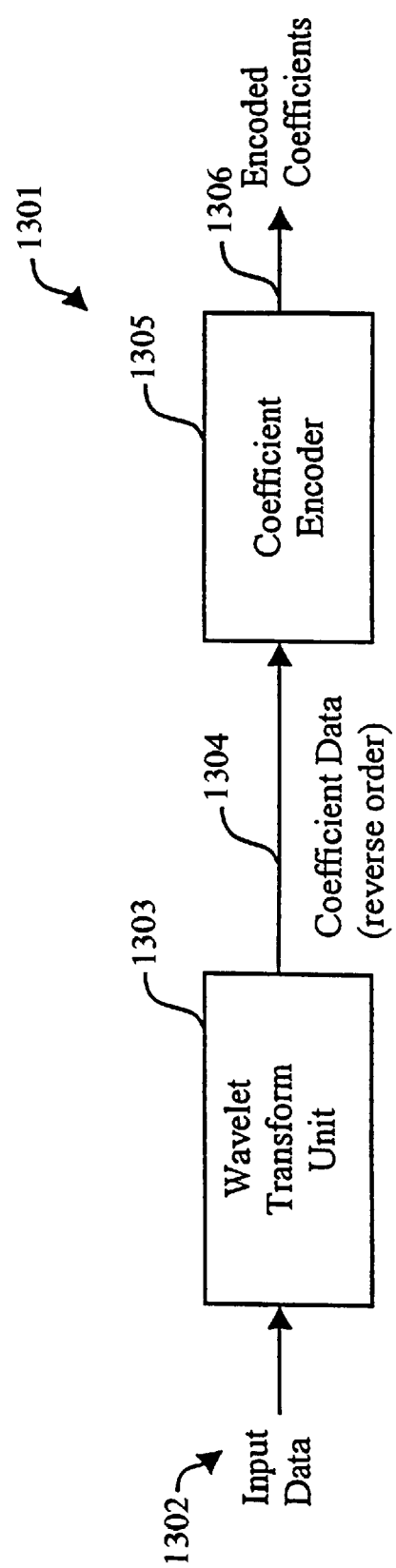
FIG. 13 illustrates a form of wavelet transform coefficient encoder.

Turning initially to FIG. 13, there is illustrated schematically an arrangement of the preferred embodiment(s) of the apparatus. The arrangement 1301 assumes that input data is input in the form of pixel data which is discrete wavelet transformed 1303 so as to produce coefficient data 1304 which is then encoded by a coefficient encoder 1305 so as to produce output encoded coefficients 1306 which are subsequently stored or transmitted depending on the particular application.

The preferred embodiment(s) in accordance with the invention are directed to a particular coefficient encoder(s) 1305, however the wavelet transform means 1303 which can be entirely standard and can take many different forms is described for clarity purposes.

A description of the wavelet transform process is given in many standard texts and in particular the aforementioned book by Stollnitz et. al. In order to assist in obtaining a proper understanding of operation of the preferred embodiment(s), a review of the wavelet process will now be described with reference to the accompanying drawings.

Figure 14:
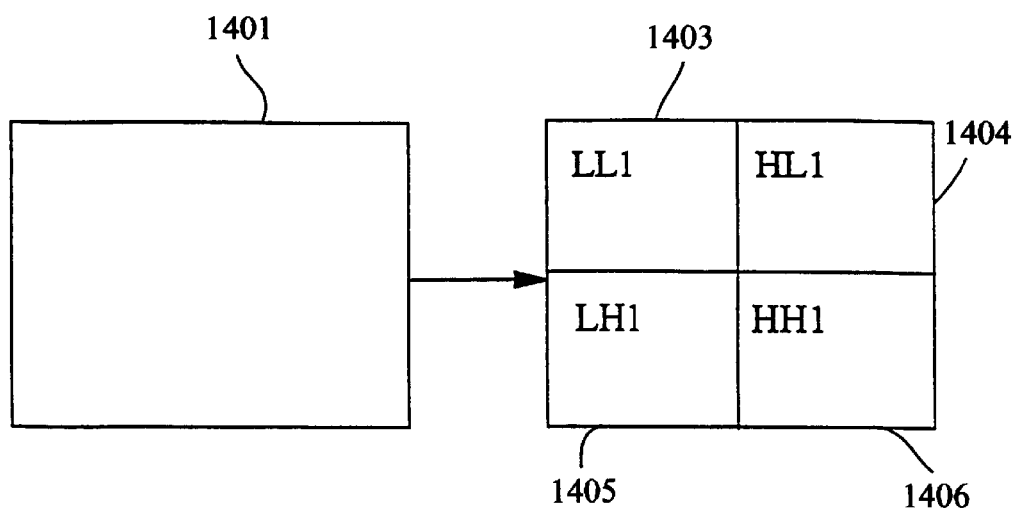
FIG. 14 illustrates a single level of the discrete wavelet transform process.

Referring initially to FIG. 14, an original image 1401 is transformed utilising a Discrete Wavelet Transform (DWT) into four subimages 1403–1406. The subimages or subbands are normally denoted LL1, HL1, LH1 and HH1. The 1 suffix on the subband names indicates level 1. The LL1 subband is a low pass decimated version of the original image.

The wavelet transform utilised can vary and can include, for example, Haar basis functions, Daubechies basis functions etc.

Figures 15, 16:
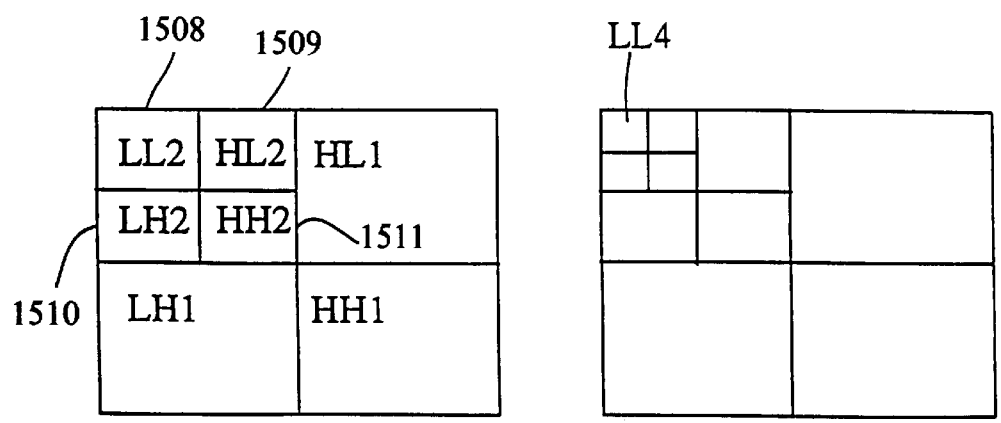
FIG. 15 illustrates a second level discrete wavelet transform.
FIG. 16 illustrates a full level discrete wavelet transform of an image.

The LL1 subband is then in turn utilised and a second Discrete Wavelet Transform is applied as shown in FIG. 15 giving subbands LL2 (1408), HL2 (1409), LH2 (1410), HH2 (1411). This process is continued for example as illustrated in FIG. 16 wherein the LL4 subband is illustrated, the LL4 band decomposition process being referred to as an octave band filter bank with the LL4 subband being referred to as the DC subband. Obviously, further levels of decomposition can be provided depending on the size of the input image.

Each single level DWT can in turn be inverted to obtain the original image.

Thus a J-level DWT can be inverted as a series of J-single level inverse DWT's.

A coded image hierarchically can proceed by coding the DC subband. Then, the remaining subbands are coded in order of decreasing level. That is for a 4 level DWT, the subbands at level 4 are coded after the DC subband (LL4). That is the HL4, LH4 and HH4 subbands. The subbands at level 3 (HL3, LH3, and HH3) are then coded, followed by those at level 2 (HL2, LH2 and HH2) and then level 1 (HL1, LH1 and HH1).

With standard images, the encoded subbands normally contain the "detail" information or energy information in an image. Hence, they often consist of a sparse array of values and substantial compression can be achieved by quantisation of the subbands and efficient encoding of their sparse matrix form.

Figure 17:
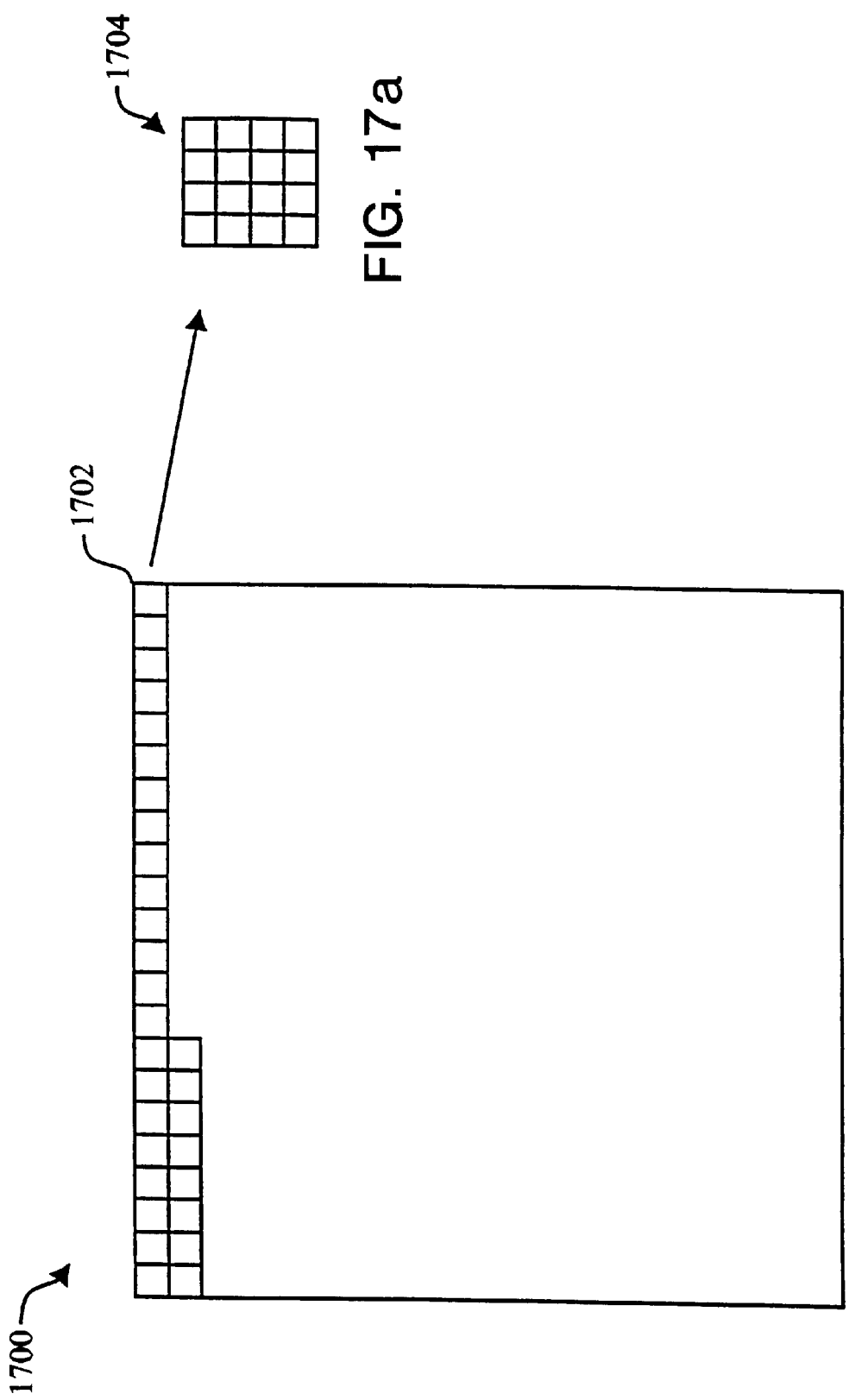
FIG. 17 illustrates a block encoding process.

In the preferred embodiment(s) of the apparatus, the coefficient encoder 1305 receives the coefficient data 1304 from the wavelet transform unit 1303. Although the present invention has application to image blocks of any size, for ease of explanation it will be assumed that an image eg. 1700 as illustrated in FIG. 17 is broken into 4×4 blocks 1704 of pixels. Normally, the present invention will have application to image blocks N×N, which are larger than the 4×4 blocks. The 4×4 blocks are then independently fed to the wavelet transform unit 3 for wavelet transforming with an enlarged view of the block 1704 illustrated in FIG. 17a.

For most normal images, it is known that the wavelet transform process results in most of the energy or significance appearing in the lower frequency coefficients.

Figures 18, 20:
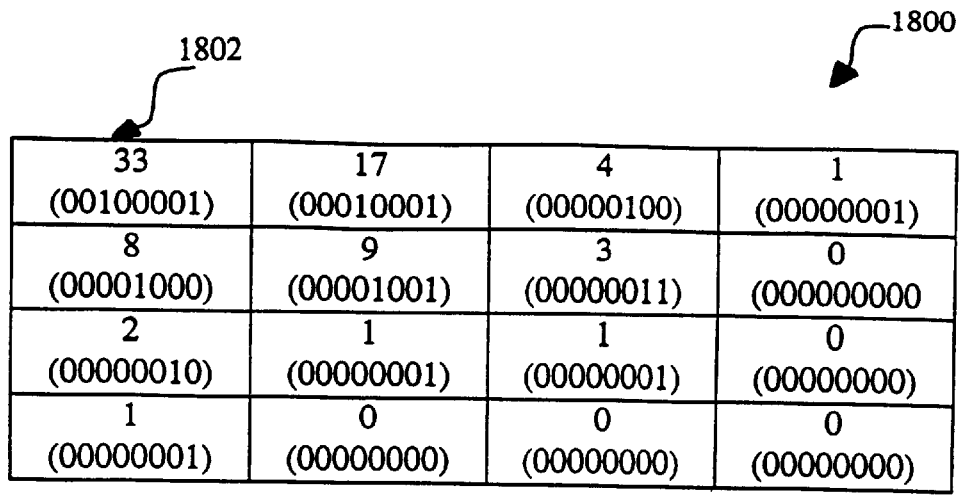
FIG. 18 illustrates one example of a 4×4 block of the encoding method.
FIG. 20 illustrates the coefficient output process.

Turning to FIG. 18, there is shown an example output 1800 of a standard wavelet process with the coefficients eg. 1802 being shown in a decimal and 8-bit binary format.

The coefficient encoder 1305 of FIG. 13 is responsible for encoding the coefficients 1800 of each 4×4 block in accordance with the second image compression method as described in the aforementioned section "1.4 Encoding Process of Second SWEET Image Compression Method" in an efficient manner. The coefficient encoder 1305 can also be modified, as will be apparent to a person skilled in the art, to encode the coefficients of an image in accordance with the first image compression method as described in the aforementioned section "1.1 Encoding Process of First SWEET Image Compression Method" in a similiar efficient manner. However, for the purposes of the description, the preferred embodiments are described with reference only to the preferred apparatus and method for implementing the second image compression method.

The basic algorithm of the second image compression method relies upon the expected magnitude of coefficients for standard images to efficiently encode the coefficients. Turning again to FIG. 15, it is assumed for operation of the second image compression method that the coefficient LL2 is likely to be the most significant followed by HL2, LH2, HH2 and then followed by the level 1 coefficients HL1, LH1 and HH1.

Figure 19:
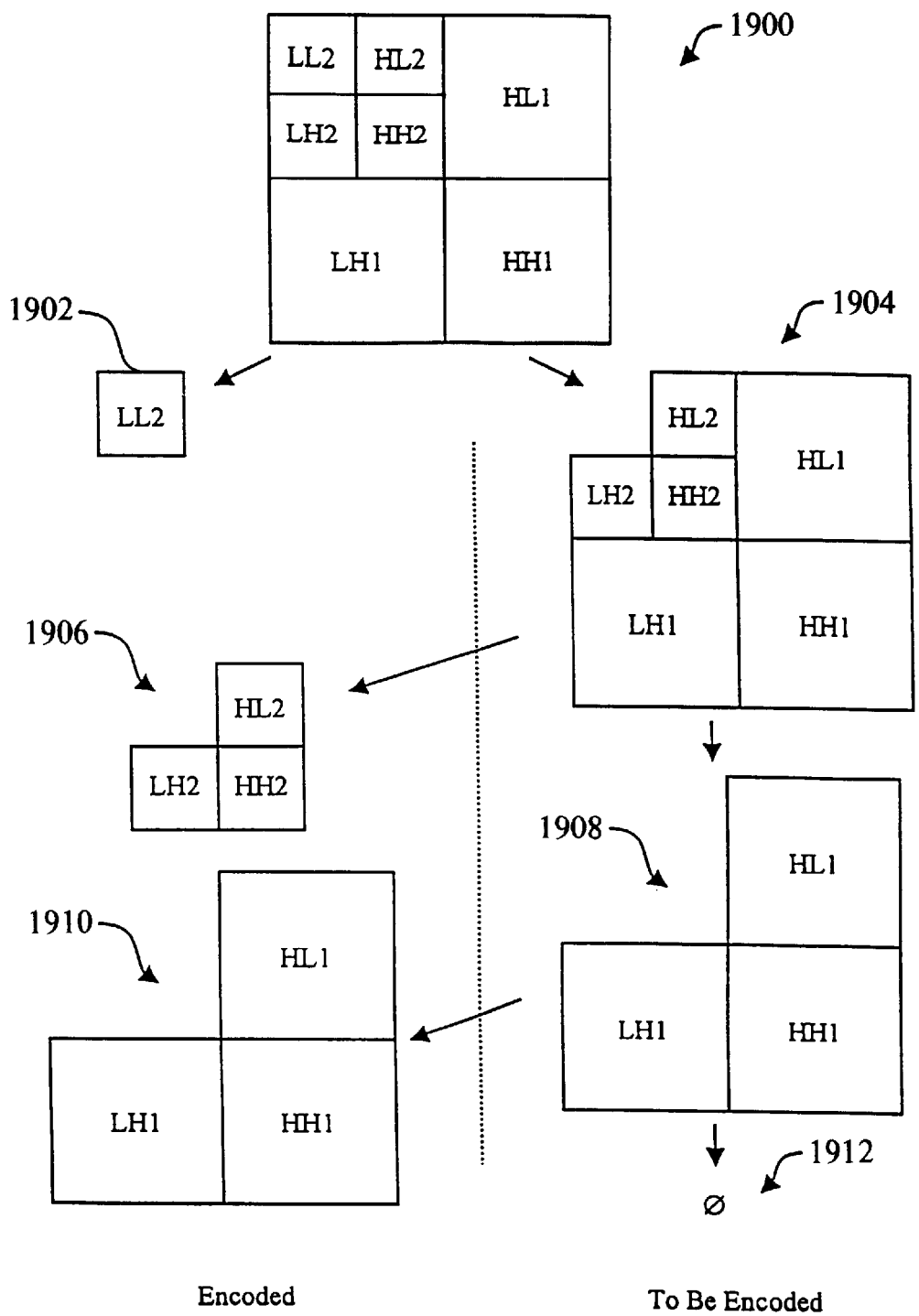
FIG. 19 illustrates the encoding methodology.

The original coefficient matrix is then as illustrated 1900 in FIG. 19. In the second image compression method, it is assumed that the coefficients take on 8-bit values in accordance with the example as illustrated in FIG. 18. The preferred methodology is to sort the coefficients by magnitude and output a zero for each leading zero of the most significant magnitude coefficient. Once a 1 value of the binary coefficient is reached, the LL2 coefficient 1902 is encoded, as it is assumed that this coefficient will always be the most significant. Next, the remaining coefficients 1904 are sorted in order of magnitude and a 0 is output for each level of leading zeros until no more zeros are left. Once this situation is reached, the HL2, LH2 and HH2 coefficients are split off and encoded 1906 leaving the remaining coefficients 1908.

The remaining coefficients 1908 are then sorted in order of magnitude and a 0 output for each remaining leading zero before a 1 value is reached. Once this is the case, the remaining coefficients 1910 are encoded. This process of pulling off the lower frequency coefficients is continued, depending on the size of the input array until all the coefficients having been encoded and the null matrix is left 1912.

In FIG. 20, there is illustrated an example of the operation of the second image compression method when encoding the 4×4 matrix 1302 of FIG. 13. Taking this example in detail, the coefficient having the decimal value 33 is initially the most significant coefficient and has two leading 0's. Therefore, two zeros are output 2002, 2004 for the bit plane levels 8 and 7. Next, the coefficient value decimal 33 results in the triggering of the coefficient output 2006 which is output after the outputting of a 1 value.

Subsequently, as no other coefficients have as significant binary bits set, a 0 is output 2008 so as to reduce the bit plane level number. At this bit plane, the bit plane of decimal value 17 is set which in turn triggers the output of a one and a series of coefficients 2010 (corresponding to the coefficients 1906 of FIG. 19), and leaving the coefficients corresponding to coefficients 1908 of FIG. 19. Subsequently, the next most significant decimal value is the value 4 and so a series of zeros is output at steps 2012, 2014 before outputting a one at bit plane level 3 (2016) followed by the coefficients 2018 corresponding to the HL1 coefficients of FIG. 19. Where a block has more than a single pixel coefficient, the algorithm is applied recursively on each of the sets of coefficients, hence, the algorithm is applied recursively on the HL1 coefficients LH1 coefficients and HH1 coefficients. This necessitates the operation of a push down stack to encode these coefficients. Hence, add the step 2020 of FIG. 20 the current bit plane is again bit plane level 3 and the coefficients corresponding to LH1 are examined to determine if any are significant at this bit plane. As this is not the case as zero is output 2020 followed by a 1 and the series of coefficients as illustrated 2022. Subsequently, the HH1 coefficients are independently recursed from bit plane level 3 (2024) and a series of zeros are output 2024, 2026 until bit plane 1 is reached where one value is output and the corresponding coefficients 2028.

The encoding system described so far is described in more detail in the aforementioned patent application and details of it's operation can be found herein in the section entitled "1.4 Encoding Process of Second SWEET Image Compression Method".

It is an object of the preferred embodiments of the present invention to provide for an efficient manner of producing the coded output and coefficient output of the aforementioned image compression methods.

Figure 21:
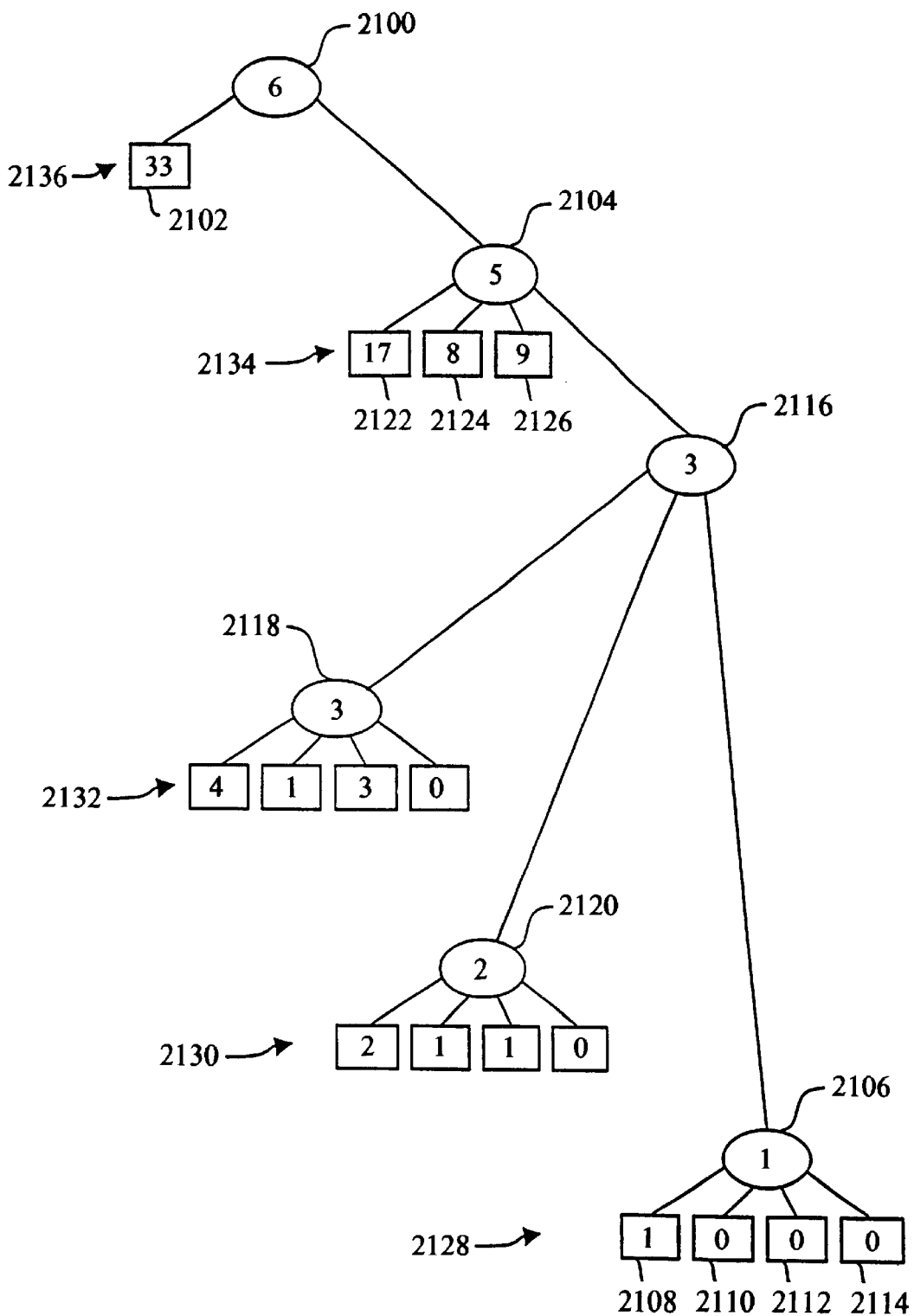
FIG. 21 illustrates a partition tree as utilised in the first, second and third preferred embodiments.

The discussion of preferred embodiments can proceed through the initial realisation that the example output structure of FIG. 20 essentially represents a partitions tree structure. An example partition tree structure corresponding to the example of FIG. 18 and FIG. 20 is as illustrated in FIG. 21. In this case, the internal nodes or circles contain the maximum number of bits to represent the pixels in sub trees below. The leaf nodes eg. 2102 contain the pixel data value and subsequent sub tree nodes eg. 2104 further encode the number of bits needed to represent the pixels in sub trees below.

By traversing the tree structure of FIG. 21, from the root 2100 taking the left most branch first, it is possible to encode the pixel data with the minimum number of bits as required. Hence, the following pseudo code can be utilised in the recursive processing of a partition tree.

```
Void ProcessNode
(
        Node n
)
{
        int nbits;
        nbits = n.key
        for all children of node n {
                if the child is a leaf
                        output child with 'nbits' bits
                else/*it is another internal node */
                        ProcessNode(child);
        }
}
```

Given an array of coefficients, it is possible to construct a corresponding tree such as that shown in FIG. 21 by starting at the right most bottom leaf of the tree 1606 which is not a leaf node. All the leaves 2108–2114 are then fetched and the minimum number of bits required to represent the leaf nodes are put into the internal node 1606. Once all the internal nodes at a certain level are filled, each of the nodes at a current level is examined (nodes 2106, 2120, 2118) and the maximum determined which is then added and becomes their parent node value 2116. The process is continued with the value at node 2104 being determined by the number of bits required to represent nodes 2122,2124,2126 and the value derived from the previous node 2116. This process is continued filling in all internal nodes until a root node is reached.

2.2 First Preferred Embodiment

Figure 22:
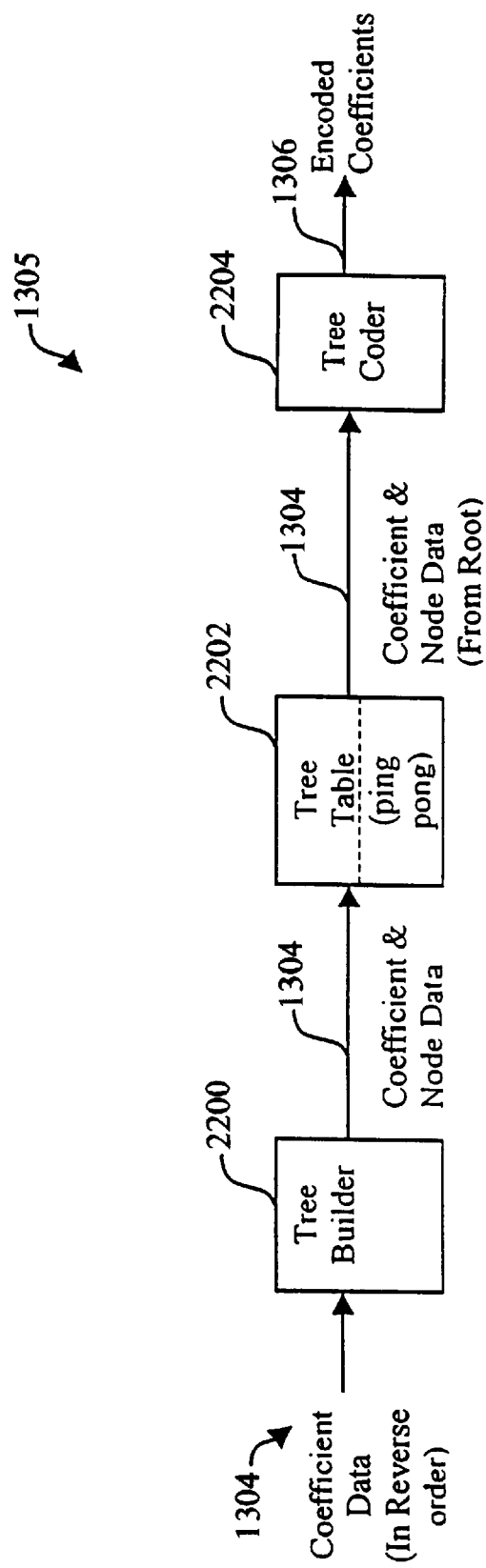
FIG. 22 illustrates the structure of the coefficient encoder of a first preferred embodiment.

Turning to FIG. 22, there is shown in more detail, a first preferred embodiment of the coefficient encoder 1305 of FIG. 13 which implements the aforementioned arrangement. The coefficient encoder 1305 is designed to provide a continual flow of output encoded data 1306 taking in corresponding data 1304. The encoder 1305 includes two main logic portions being a tree builder 2200 and tree coder 2204.

The tree builder 2200 reads the input coefficient data 1304 in reverse order and computes the value of all the internal nodes eg. 2106, 2120, 2118, 2116, 2104 and 2100 of FIG. 21 in addition to storing the coefficient values in corresponding tree locations. This data is stored in a tree table eg. 2202. Preferably, the tree table 2202 has the ability to store tables simultaneously and operates as an "ping pong" buffer such that one side of the buffer is utilised to construct a first tree while a previously constructed tree is read out of the tree table 2202 by the tree coder 2204. The buffers being swapped at the end of the construction process.

The tree coder 2204 is responsible for reading the constructed tree table from the root node downwards and encoding the pixels according to the value set in the internal nodes. The normal output of the tree coder 2204 can be as many as 4 output pixels for cycle.

Figure 23:
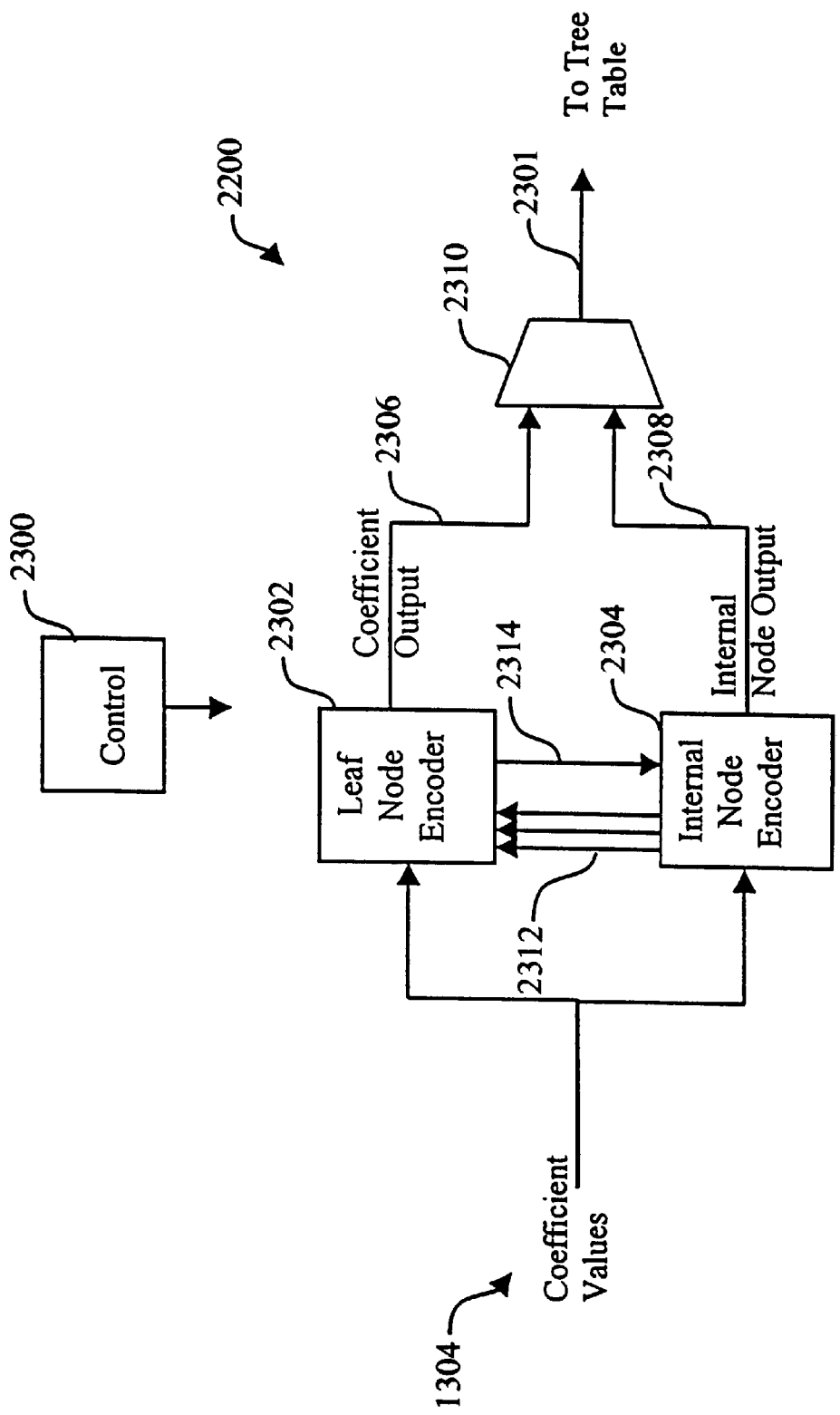
FIG. 23 illustrates the structure of the tree builder of a first preferred embodiment.

Turning now to FIG. 23, there is illustrated one possible form of construction of the tree builder 2200. The structure operates under the control of a control unit 2300 which can consist of a finite state machine. The tree builder 2200 is responsible for building the tree (FIG. 21) with appropriate output values being output 2301 to the tree table store.

The input coefficient values 1304 are fed to a leaf node encoder 1802 and an internal node encoder 2304. The leaf node encoder is responsible for outputting the coefficient data 2306 with the internal node encoder 2304 being responsible for outputting the internal node output data 2308. These values can be multiplexed 2310 to the output under the control of control unit 2300.

Figure 24:
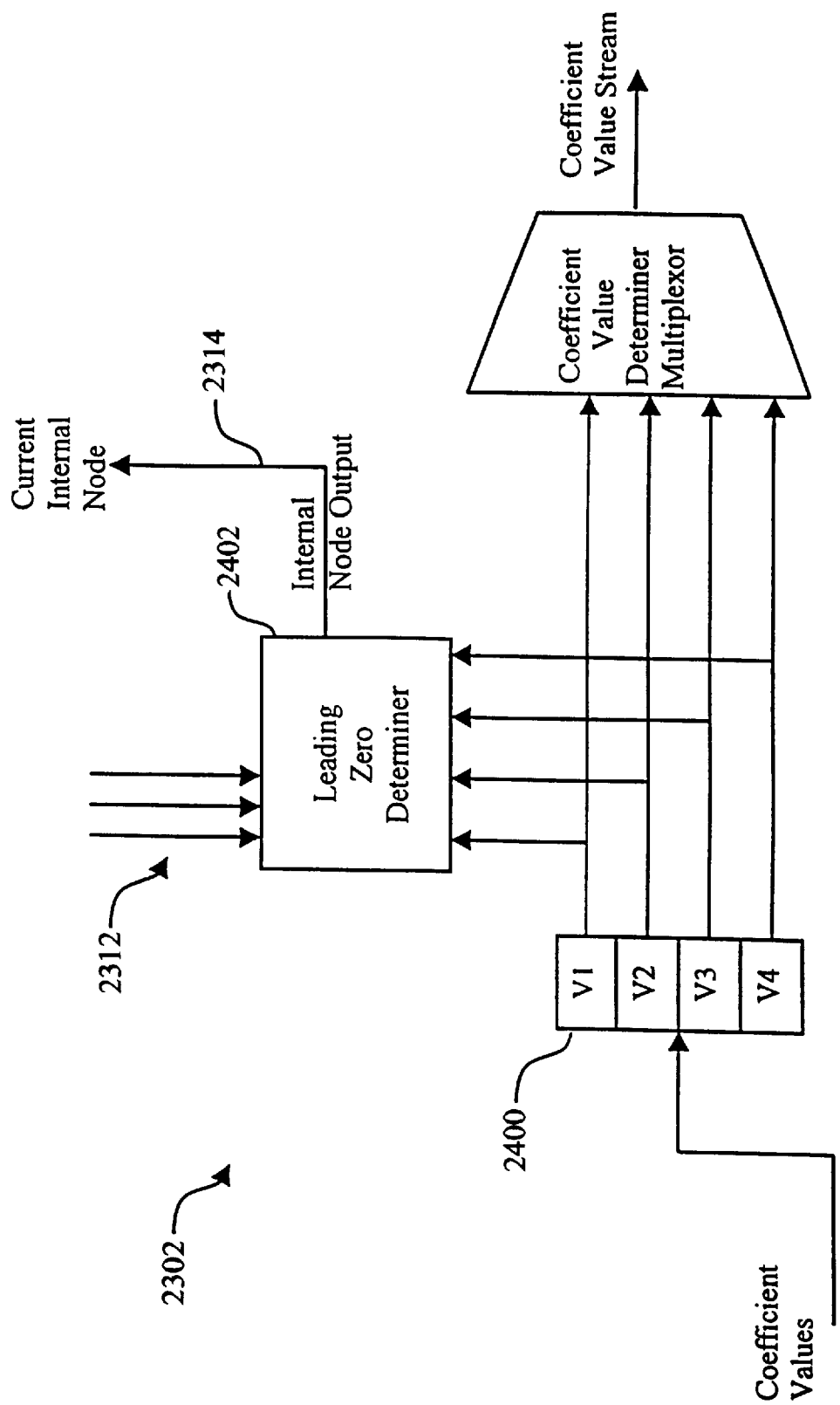
FIG. 24 illustrates the structure leaf node encoder of a first preferred embodiment.
Figure 25:
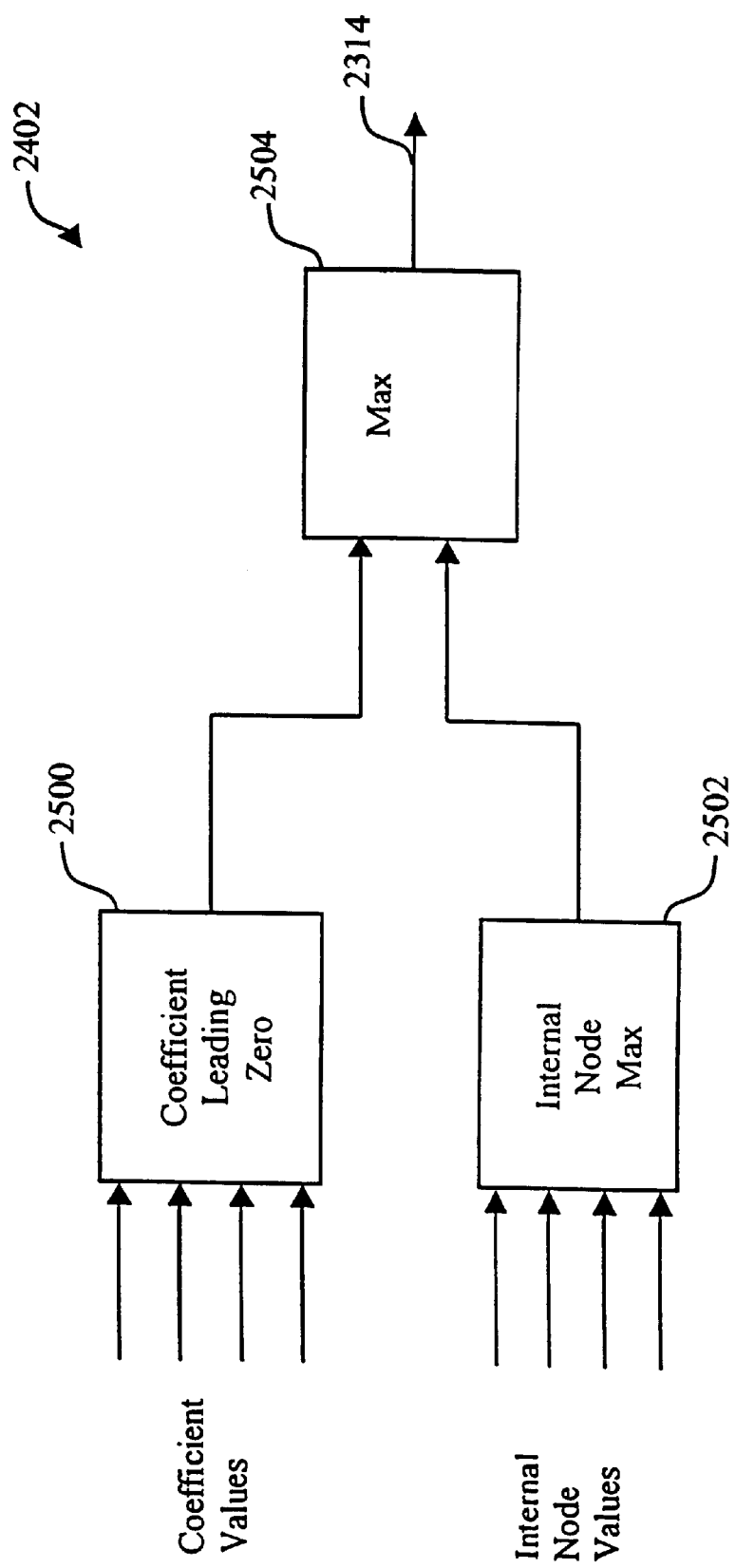
FIG. 25 illustrates a structure of the leading zero determiner of a first preferred embodiment.

Turning now to FIG. 24, there is illustrated the leaf node encoder 2302 of FIG. 23 in more detail. The leaf node encoder can be arranged as indicated in FIG. 24 wherein coefficient values are initially stored in a set of registers 2400 at each leaf level 2128–2136 as indicated in FIG. 21. A leading zero determiner 2402 is provided for determining the number of bits required to represent the input coefficients stored in a register array 2400 in addition to the input values 2312 which can include the lower internal nodes of a current output node. The maximum magnitude value of the two sets of inputs is determined and output 2314 which is in turn fed back to the internal node encoder 2304 (FIG. 23). Turning to FIG. 25, there is illustrated one form of leading zero determiner which is a first series of comparaters 2500 to determine the most significant bit of all the input coefficient values and a second series of comparaters to determine the maximum input node value. A final series of comparaters 2504 determines the maximum of the two outputs from units 2500, 2502 to produce a current internal node output value 2314. It will be understood that, at various levels, various input signals are not present. In such case, zero values can be utilised with the zero values having no effect on the leading zero determiner 2402.

Returning to FIG. 23 the internal node encoder 2304 is responsible for storing the leaf node encoder output values 2314 for feeding back 2312 to the leaf node encoder at the requisite time in addition to outputting internal node outputs 2308 again at the requisite time under the control of the state machine 2300.

It will therefore be evident that the tree builder 2200 of FIG. 23 takes coefficient values as the input and encodes the tree structure of FIG. 21 as its output.

Returning to FIG. 22, the tree coder is responsible for reading the partition tree structure of FIG. 21 from tree table 2202 and outputting the encoded data 1306. The tree coder 2204 implements the algorithm "process node" as set out previously. The tree coder again can include a state machine and associated storage and control circuitry for implementing the aforementioned algorithm.

Figure 26:
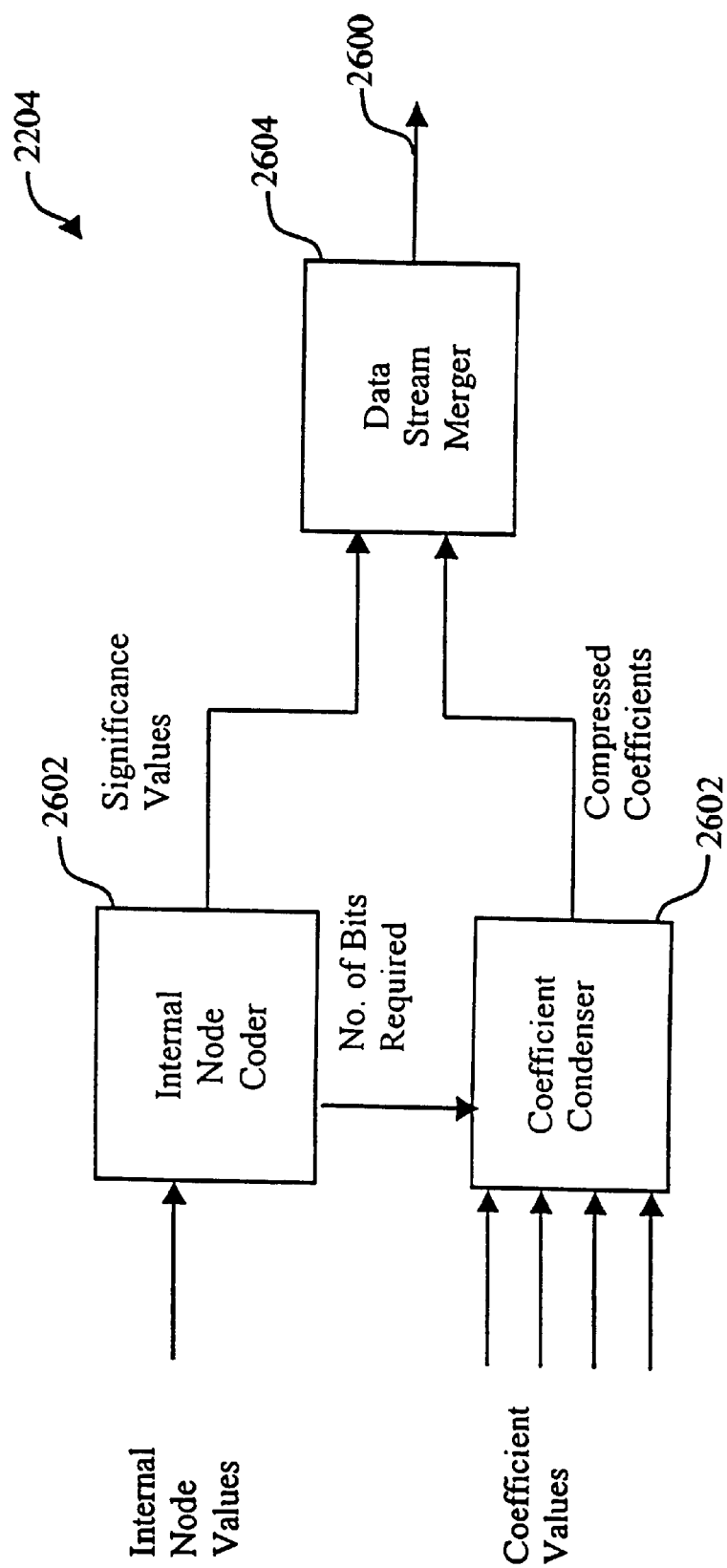
FIG. 26 illustrates a structure of the tree coder of a first preferred embodiment

Turning to FIG. 26, there is illustrated an example form of the tree coder 2204. When an internal node with 4 leaf nodes is encountered by Internal Node Coder 2602, the internal node coder outputs a number 0's and a 1 to lower the significant bit plane to the required level. It also outputs the number of bits required to a coefficient condenser 2602. The coefficient condenser 2602 takes up to 4 coefficients picks up the require number of bits from each and packs them together. The data stream merger 2604 accepts the significance information from internal node coder 2602 and compressed coefficient from the coefficient condenser 2602 and packs them together. However, when an internal node with all internal children nodes is encountered, on the signifiance information is outputted. The control to tree coder 2204 can consist of a state machine that follows the structure of the partition tree.

Figure 35:
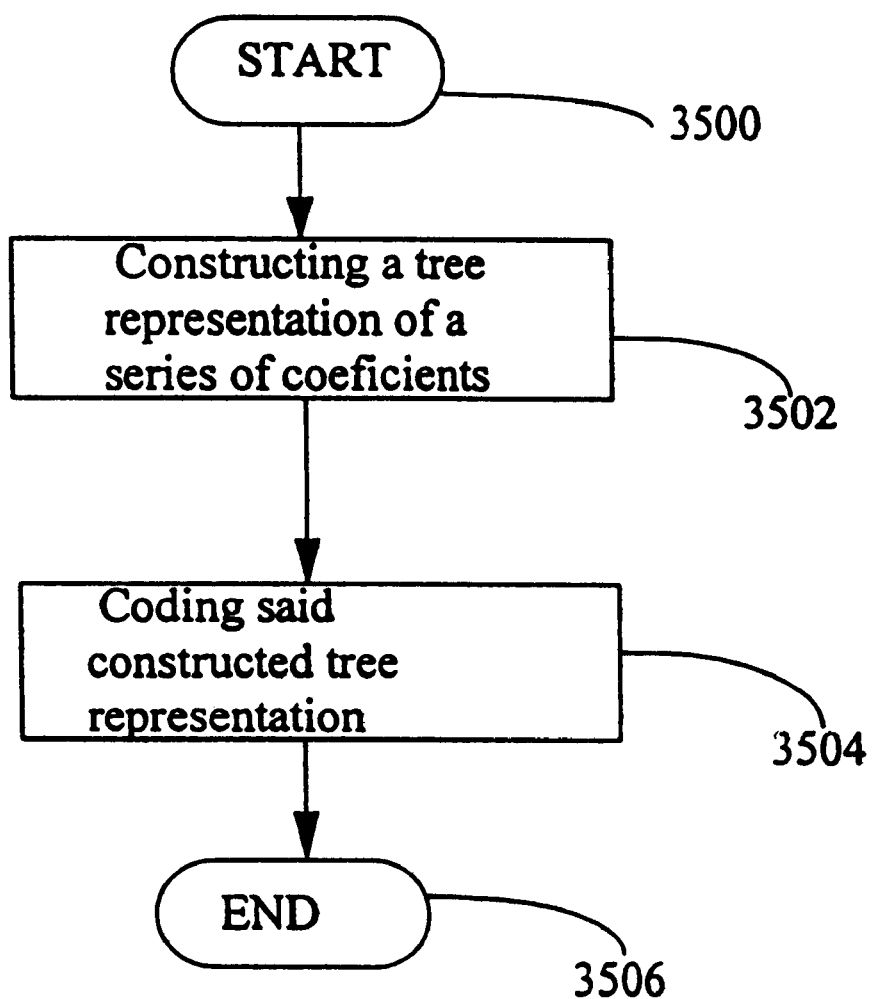
FIG. 35 is a flow diagram of a method of encoding a series of coefficients in accordance with the first preferred embodiment.

Turning to FIG. 35, there is illustrated a method of encoding a series of coefficients in accordance with the first preferred embodiment. In step 3500, any necessary parameters are initialized and a series of coefficients of a transformed image are inputted. In the next step 3502, a tree representation of these series of coefficients is constructed. This tree construction begins by reading the input coefficient data in reverse order and computing the value of all the internal nodes e.g. 2106,2120,2118,2116,2104, and 2100 of FIG. 21 in addition to storing the coefficient values in corresponding tree locations. This data is preferably stored in a double buffer, such that one side of the buffer is utilised to construct a first tree while a previously contructed tree is read out from the buffer. In the next step 3504, the constructed tree representation is encoded. This encoding takes the form of the algorithm ProcessNode set out previously. The processing terminates at step 3506.

It will therefore be evident that the first preferred embodiment provides an efficient form of rapid encoding of coefficient data and can be readily implemented in hardware so as to provide for high speed coefficient data encoding.

2.3 Second Preferred Embodiment

Figure 27:
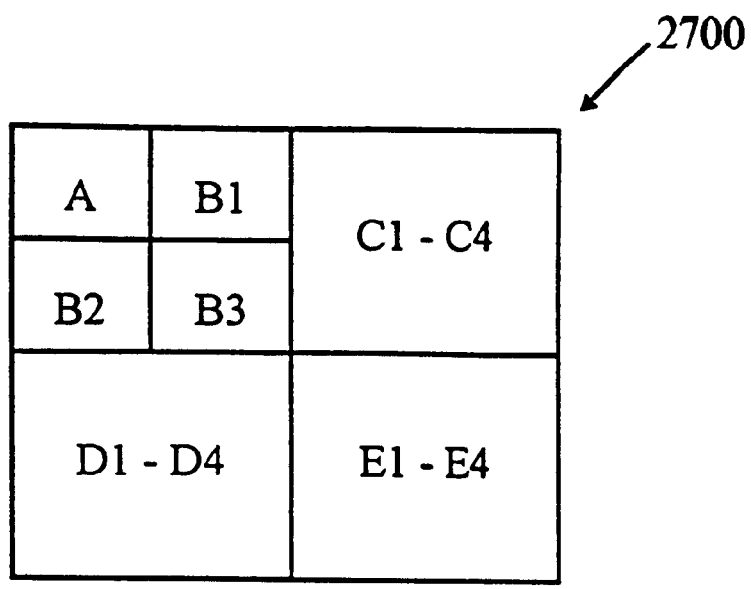
FIG. 27 illustrates the division of coefficients into groupings utilised by a second preferred embodiment.

Turning to FIG. 27, it can be seen therefore that a wavelet coefficient matrix can be divided into groups or sets of coefficients for each separate level of encoding. The A coefficient at the level 2136 (FIG. 21) is the first coefficient to be encoded. The B coefficients B1, B2 and B3 are encoded at the level 2134 (FIG. 21) next, the C coefficients C1–C4 are encoded at the level 2132 (FIG. 21) as a group followed by the D coefficients at the level 2130 and the E coefficients at the level 2128. Such a format is preferably utilised in the encoder of the second preferred embodiment.

Figure 28:
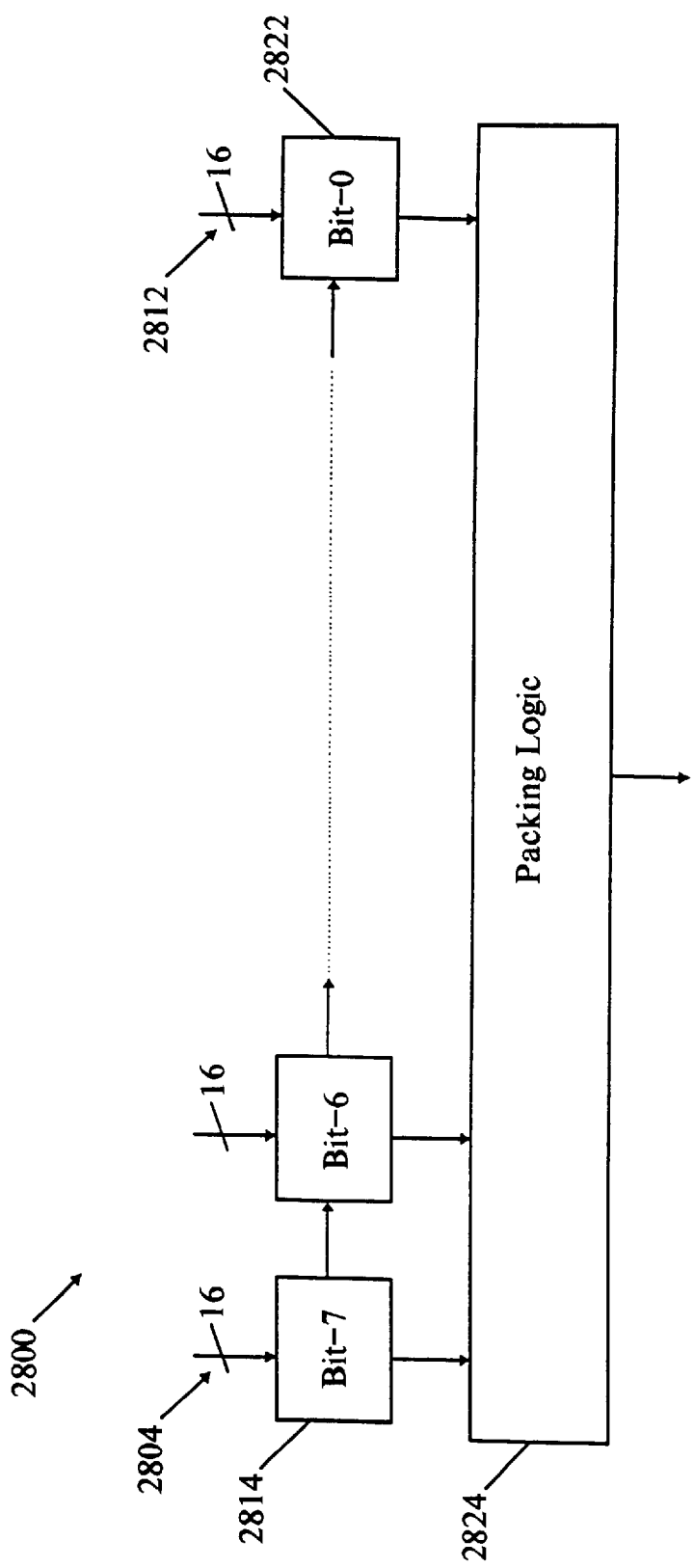
FIG. 28 illustrates the structure of the encoder of a second preferred embodiment.

Turning to FIG. 28, there is illustrated 2800 one form of a high speed encoder which, takes as its input the coefficient matrix divided into bit planes from the least significant bit plane 2804 to a most significant bit plane 2812. Each of the bit planes are forwarded to identical bit plane units eg. 2814, . . . ,2822. The outputs of the bit plane units are forwarded to a packing logic unit 2824 which outputs the encoded form of the coefficient data. Outputs are also forwarded to adjacent bit plane units.

Figure 29:
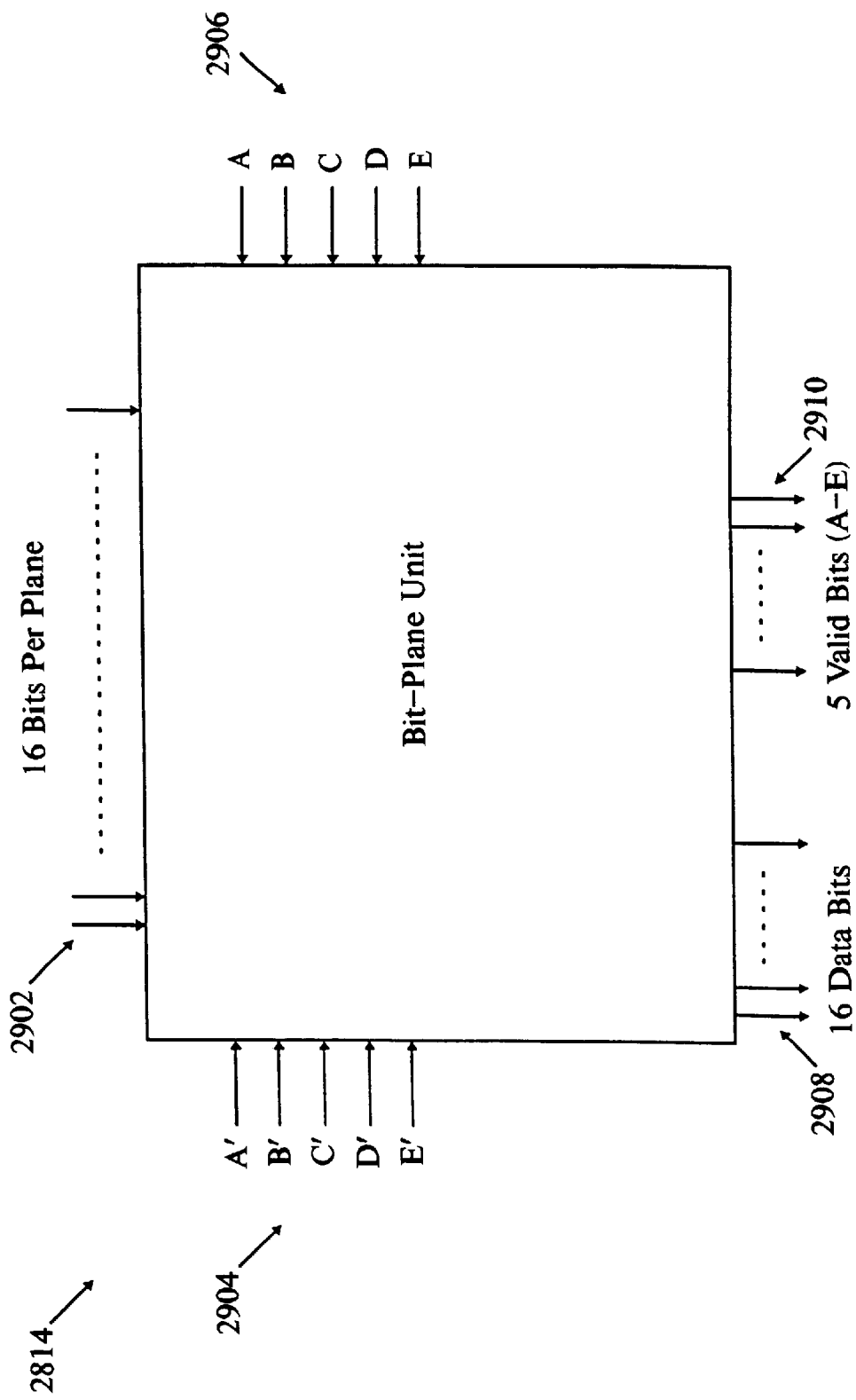
FIG. 29 illustrates a single bit plane unit of FIG. 28.

Turning to FIG. 29, there is illustrated one form of bit plane unit 2814. The bit plane unit 2814 takes inputs 2902 and 2904. The inputs 2902 include the 16 bits of the corresponding bit planes and the inputs 2904 include the data valid bits A–E from the previous bit plane unit. The bit plane unit outputs data valid bits A–E, 2906 to a next bit plane unit. Also output to the packing logic unit are the 16 input data bits 2908 and the 5 data valid bits 2910. The bit plane unit implements the following logic equations with the '+' being logical OR operation:

$A = A' + Bit_A$ $B = B' + (Bit_{B1} + Bit_{B2} + Bit_{B3})$ $C = C' + (Bit_{C1} + Bit_{C2} + Bit_{c3})$ $D = D' + (Bit_{D1} + Bit_{D2} + Bit_{D3} + Bit_{D4})$ $E = E' + (Bit_{E1} + Bit_{E2} + Bit_{E3} + Bit_{E4})$

Hence, it can be seen that the bit plane units determine when each groups of coefficients A–E are valid.

Figure 30:
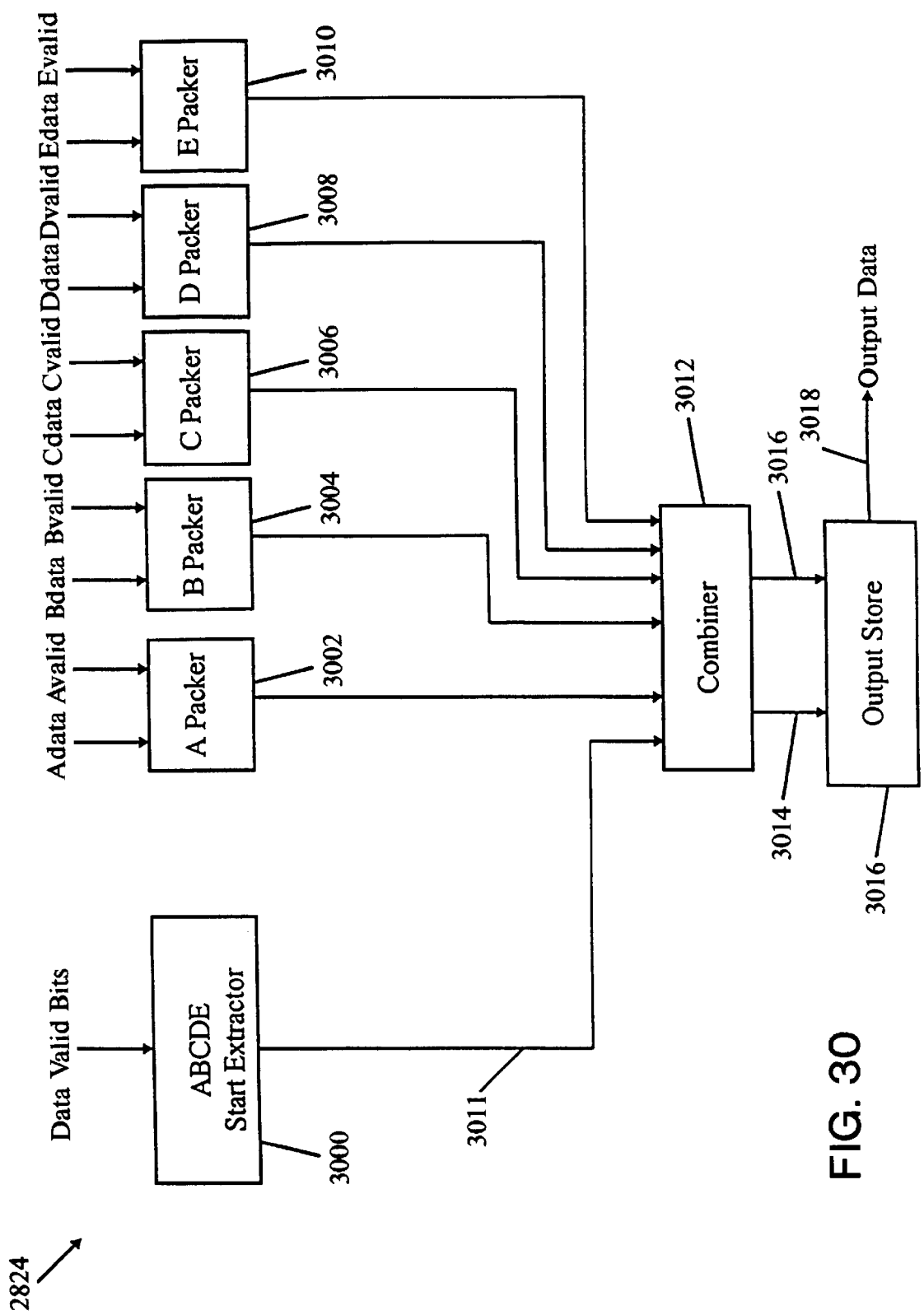
FIG. 30 illustrates the structure of the packing logic of a second preferred embodiment of an encoder.

Turning now to FIG. 30, there is illustrated one form of implementation of the packing logic circuitry 2824 of FIG. 28. The packing logic includes an ABCDE start address extractor 3000 responsible for extracting the start addresses from the input set of data valid bits. Further, a series of data packers 3002–3010 are provided for packing the coefficient data into contiguous units having coefficients of a predetermined size. The start addresses 3011 and data outputs from the data packers 3002–3010 are forwarded to a combiner unit 3012 which combines the data to form the correctly formatted coefficient stream 3014 of a predetermined output size 3016. The coefficient stream data is then forwarded to an output store 3016 for subsequent output 3018 in accordance with requirements.

Figure 31:
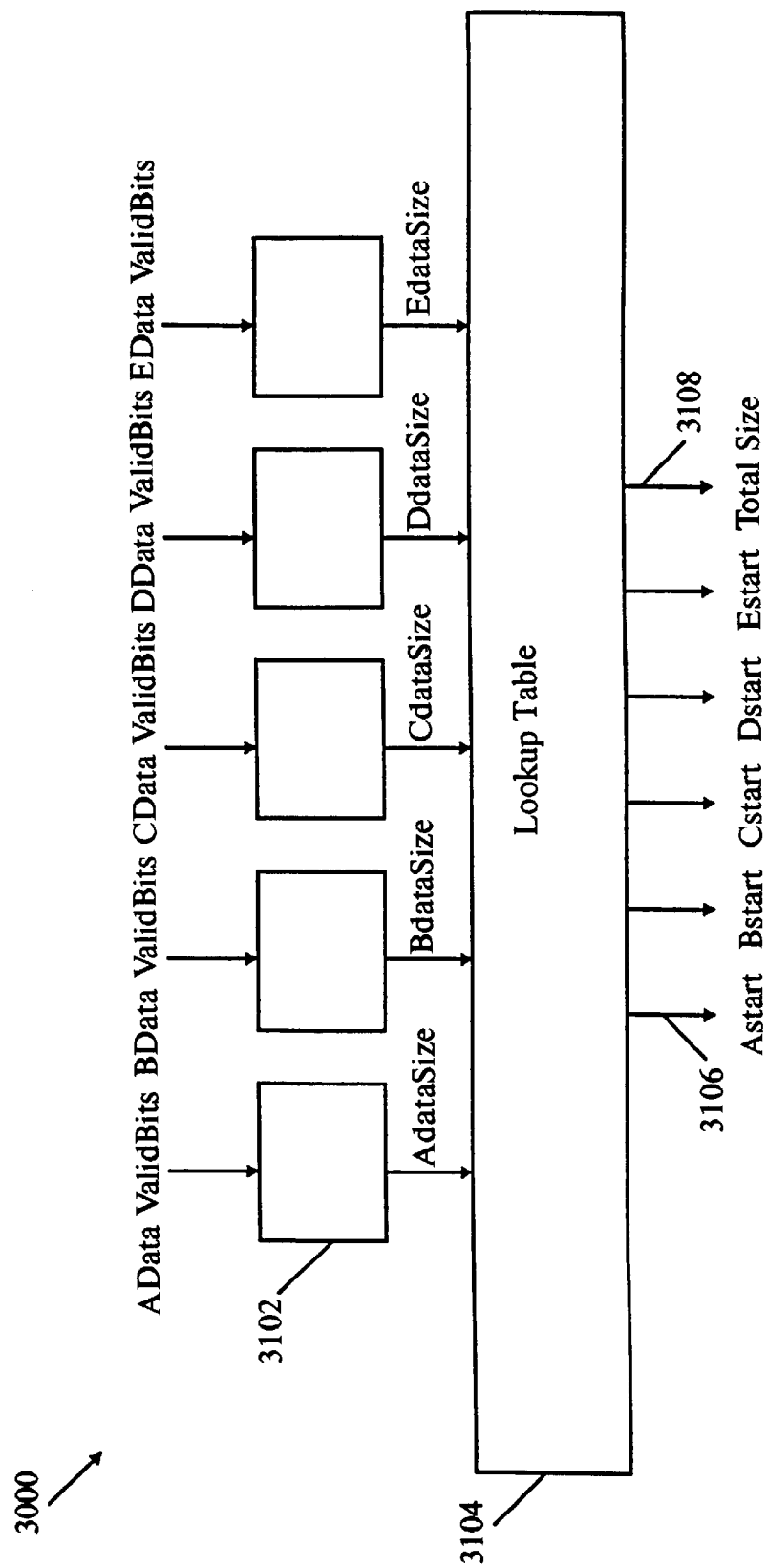
FIG. 31 illustrates the structure of the A, B, C, D, E start extractor 130 of FIG. 30.

Given the data valid bits, it is possible to determine the starting point of each sets of coefficients A, B, C, D and E. The structure of the A, B, C, D, E start extractor 3000 can be as illustrated in FIG. 31. The data valid bits for each coefficient component A–E are forwarded to a corresponding magnitude unit outputter eg. 3102 which outputs a value corresponding to the most significant data bit. This process is repeated for each output data components and the outputs are utilised in a lookup table 3104 which can be pre-calculated so as to output coefficient start values Astart— Estart in addition to the total size 3108 of the coefficient data.

Returning to FIG. 30, the output from the A, B, C, D, E start extractor is forwarded to the combiner unit 3012 in addition to the outputs from the data packers.

Figure 32:
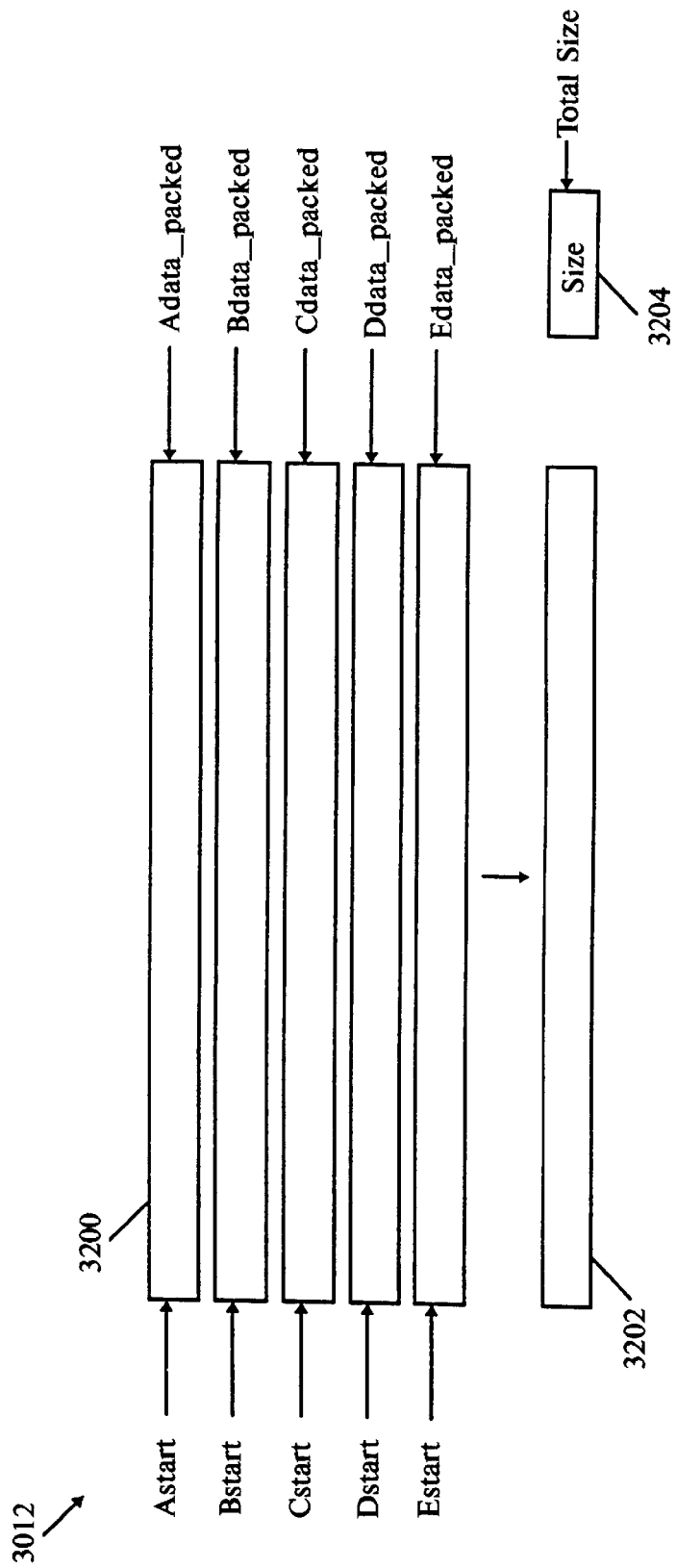
FIG. 32 illustrates the structure of the combiner unit of FIG. 30.

Turning now to FIG. 32, there is illustrated the combiner unit 3012 of FIG. 30 in more detail. The combiner unit can consist of a series of identical barrel shifters eg. 3200 which can latch the corresponding data inputs eg. Adata$_{13}$packed from the corresponding packer. The data inputs are barrel shifted in accordance with the corresponding start input (Astart) so that they are in the correct position. The outputs from the barrel shifters eg. 3200 are then ORed together to form final outputs 3202 which forms the output data. Additionally, the total size value 3108 from the lookup table is output as the size data 3204.

Returning to FIG. 30, the output data is then forwarded to the output store 3016 wherein it can be barrel shifted in accordance with the total size value 3204 of FIG. 32 which is output 3016 (FIG. 30) with the final output data 3018 being output on demand.

It can therefore be seen that the arrangement of FIG. 28 provides for a high speed system of creating an output encoding of coefficients. The coefficient planes are effectively dealt with in parallel and packing also occurs in a parallel process. Further, the arrangement is of a structured pipeline format leading itself readily to pipeline implementations thereby increasing throughput.

Figure 36:
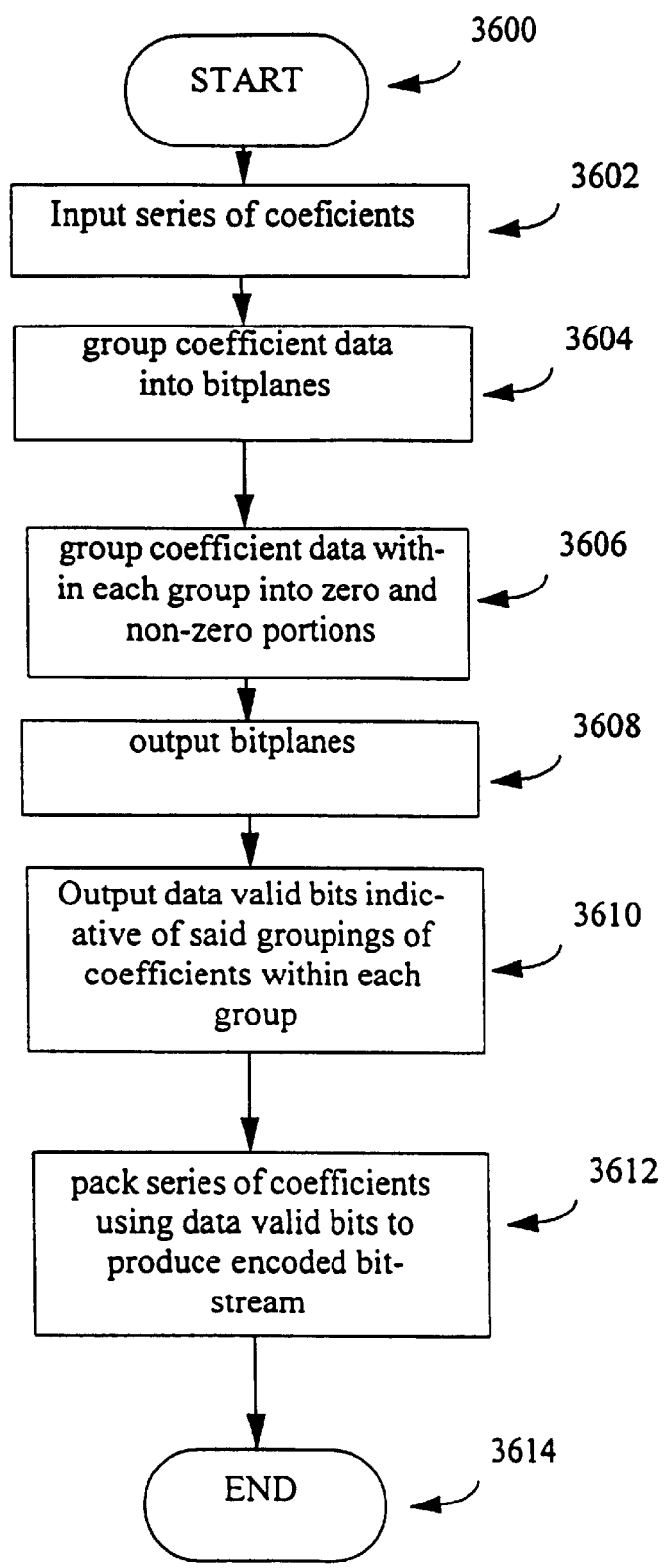
FIG. 36 is a flow diagram of a method for the creation of an encoded bit stream from a series of coefficients in accordance with second preferred embodiment.

Turning now to FIG. 36, there is shown a flow chart of a method for the creation of an encoded bit stream from a series of coefficients in accordance with the second embodiment. In step 3600, any necessary parameters are initialised. In the next step 3602, a block of coefficients is inputted. This block of coefficients are preferably coefficients of a wavelet transform which for the purposes of the description is an 4×4 array of coefficients with each coefficient having 8 bits. In the next step 3604, the coefficient data is grouped into bitplanes. In the preferred embodiment of the high speed encoder shown in FIG. 28, the coefficient data is grouped as bitplanes and fed to the bitplane units 2804–2812. In the next step 3606, the coefficient data is also grouped into zero and non-zero portions within each group A, B,C,D,E as shown in FIG. 27. For instance the coefficient data within B may be grouped as 00011111. The leading three zeros indicating the $7^{th}$, $6^{th}$, and $5^{th}$ bitplanes within B all contain zeros. The following 5 ones indicated that the $4^{th}$, $3^{rd}$, $2^{nd}$, $1^{st}$ and $0^{th}$ bitplanes each contain at least one nonzero. In the next step 3608, the bitplanes containing the coefficients are outtputted. In the next step 3610, data valid bits indicative of said zero and non-zero groupings within each group A,B, C,D, and E are outputted. There are 5 data valid bits for each outputted bitplane corresponding to the groups A,B,C,D, and E. The data valid bit is indicative of the zero/non-zero groupings. For instance, in the example given above, the data valid bit for the $7^{th}$ bitplane for the B group is one. In the next step 3612, the bitplanes comprising the coeffiecents are packed utilizing the data valid bits to produce the encoded bit stream. The processing terminates at step 3614.

2.4 Third Preferred Embodiment

Figure 33:
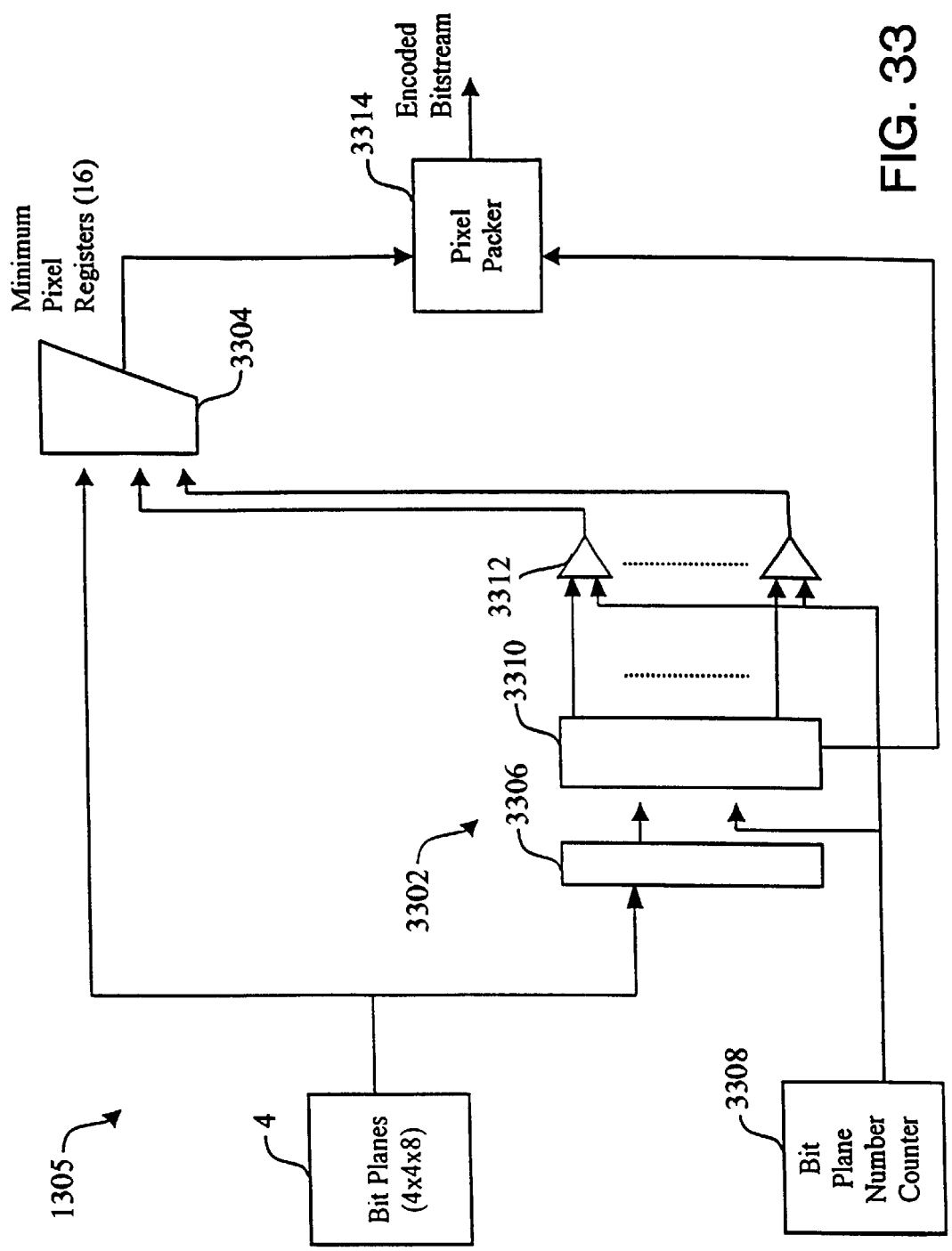
FIG. 33 illustrates the coefficient encoder of a third preferred embodiment.

Turning now to FIG. 33, there is illustrated the operation of the preferred third embodiment of the coefficient encoder 1305. In the third preferred embodiment, it is assumed that the input data 1304 includes blocks of 4×4 arrays with each coefficient having 8 bits. In the third preferred embodiment, the pixel data is fed into the coefficient encoder with one bitplane at a time being forwarded to the coefficient encoder, starting at the most significant plane. The main operational components of the coefficient encoder include a series of numbit registers 3302, a series of minimum pixel registers 3304 and a pixel packer 3306.

The numbit registers 3302 are initially all reset on a new block being forwarded to the coefficient encoder 1305. The numbit registers include a set of 16 1 bit registers, one for each coefficient, 3306, which are set upon the receipt of the first one from the bit plane input 1304. A bit plane number register 3308 is provided for counting down the bit planes as they are input and a series of 16 3 bit registers are also provided 3310 for storing the corresponding bit plane number when the 1 bit register is set. Hence, the 1 bit register 3306 is latched high when a 1 bit is received from the input with the corresponding level being latched within the 3 bit register 3310. Once a 1 bit status register 3306 has been set, further latchings do not occur. Each of the 16 3 bit numbers 3310 is output to a bank of comparators 3312 which compare the output value with the current bit plane number 3308. If the contents of the bit plane number counter 3308 is less than or equal to the corresponding value in the numbit register 3310, the plane data value is latched in the corresponding one of the minimum pixel registers 3304. Hence, the minimum pixel registers store the coefficients which are to be output and the numbit registers store the number of significant bits of each coefficient. The pixel packer 3314 accesses the minimum pixel register 3304 and the numbits registers 3302. The pixel packer 3314 reads the contents of both the numbit registers 3302 and the minimum pixel registers 3304 to determine how to pack their pixels together. The output of the pixel packer is then the required bit stream.

The pixel packer 3314 reads values from the numbit registers 3302 to determine the most significant bit of each of the coefficients and reads minimum coefficient values from the minimum pixel registers 3304 so as to output the minimum coefficient values and 0's indicative of the number of significant bits in the manner described with reference to the "1.4 Encoding Process Second SWEET Image Compression Method".

Figure 34:
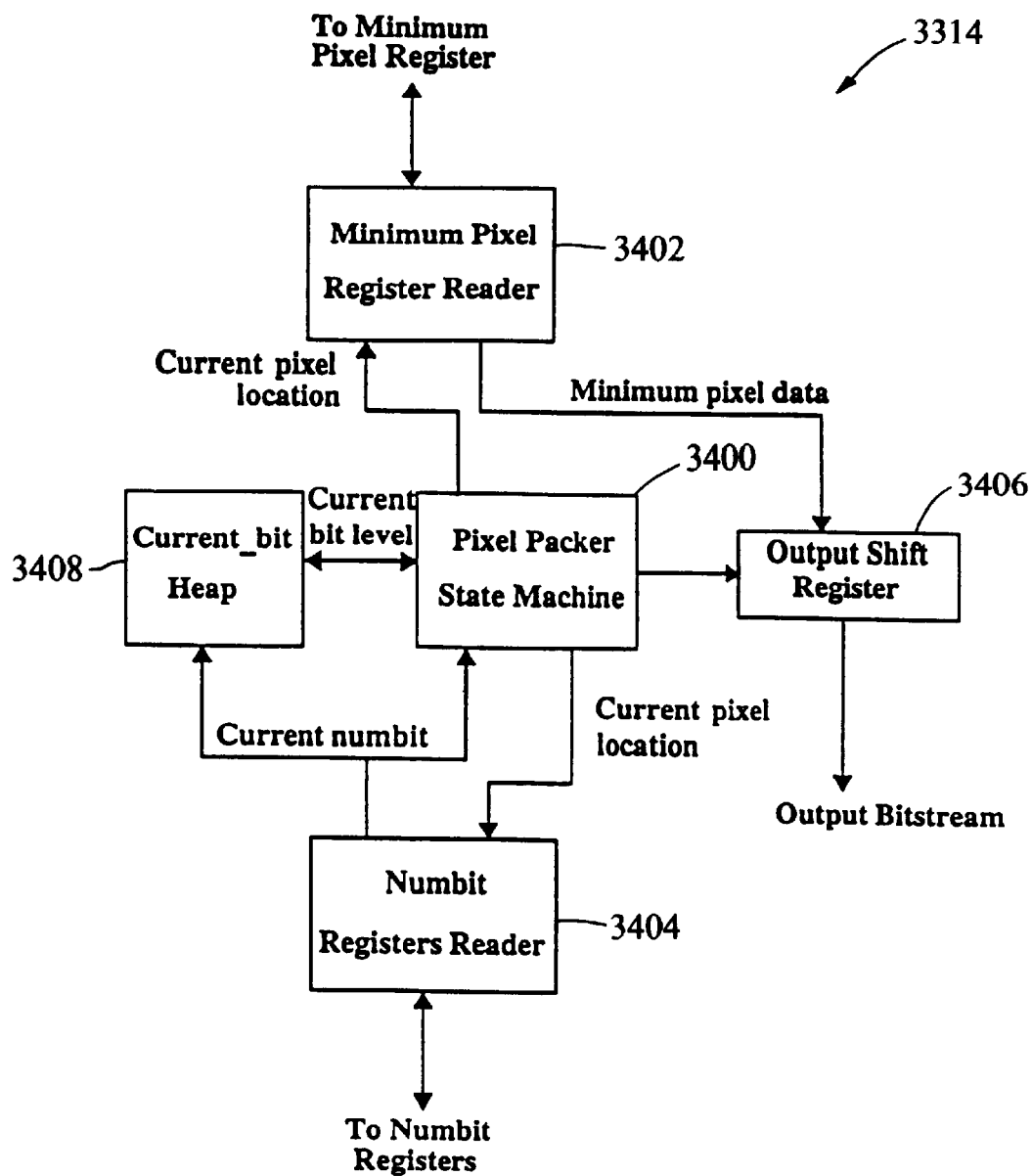
FIG. 34 illustrates the pixel packer used in the coefficient encoder of FIG. 33

FIG. 34 illustrates an example of such a pixel packer 3314. The pixel packer 3314 includes a finite state machine 3400 which knows the partition structure and accesses the relevant pixels from the numbit registers 3302 and minimum pixel registers 3304 in a predetermined manner. For instance, the DC pixel value is normally accessed first by the finite state machine 3400. The finite state machine 3400 sends the relevant location to the minimum pixel register reader 3402 and the numbit registers reader 3404 which retrieve the associated numbit value and minimum pixel value. The finite state machine 3400 then compares the current bit level with the numbit value. Initially the current bit level is set to the maximum number of bits. If the numbit value is less than the current bit level, then the finite state machine 3400 first outputs to an output shift register 3406 a series of zeros equivalent to the difference between the current bit number and the numbit number. The finite state machine 3400 then subsequently outputs the minimum pixel bit value to the output register 3406. Lastly, the finite state machine 3400 sets the current bit level to the numbit level which is then stored on the heap 3408. However, if the numbit value is equal to the current bit value then the finite state machine 3400 only outputs the minimum pixel value. It is in this way, that the leading zeros portion are interleaved with the coefficient portions.

Assuming the dimension of the block be N×M, and there are K bits per pixel. It will take K cycles to fill in the numbits registers and minimum pixel registers, and it will take N*M/4 cycles to output the bitstream, assuming that the pixel packer can pack 4 pixels at one time where required.

Of course, many different alternative arrangements are possible. For example, the arrangement can be modified so as to duplicate the minimum pixel registers and numbit registers such that the pixel packer 3314 is outputting one coded block while the minimum pixel registers and the numbits registers are being filled for a subsequent coding block. As a further alternative, the minimum pixel registers 3304 can have fewer storage elements for the higher frequency coefficient components. In this case, when the magnitudes of the bottom right pixels exceed the permitted range, then overflow occurs. Errors can be eliminated or reduced by the following method:

1. Use the numbits registers to determine the magnitude of the pixel, and insert a "1" at the appropriate bit position to make the output pixel to have the same order of magnitude.
2. Rescan the bit planes again, but this time the old numbits registers are used to rearrange where the pixels are stored in the minimum pixel registers so that the bottom right pixels have more storage elements than usual. The pixel packer has to be reconfigure to recognise the changed pixel positions.
3. Have a full pixel registers instead of a minimum pixel register, so that every bit in every pixel is stored.

It will therefore be evident that the third preferred embodiment provides an efficient form of rapid encoding of coefficient data and can be readily implemented in hardware so as to provide for high speed coefficient data encoding.

Figure 37:
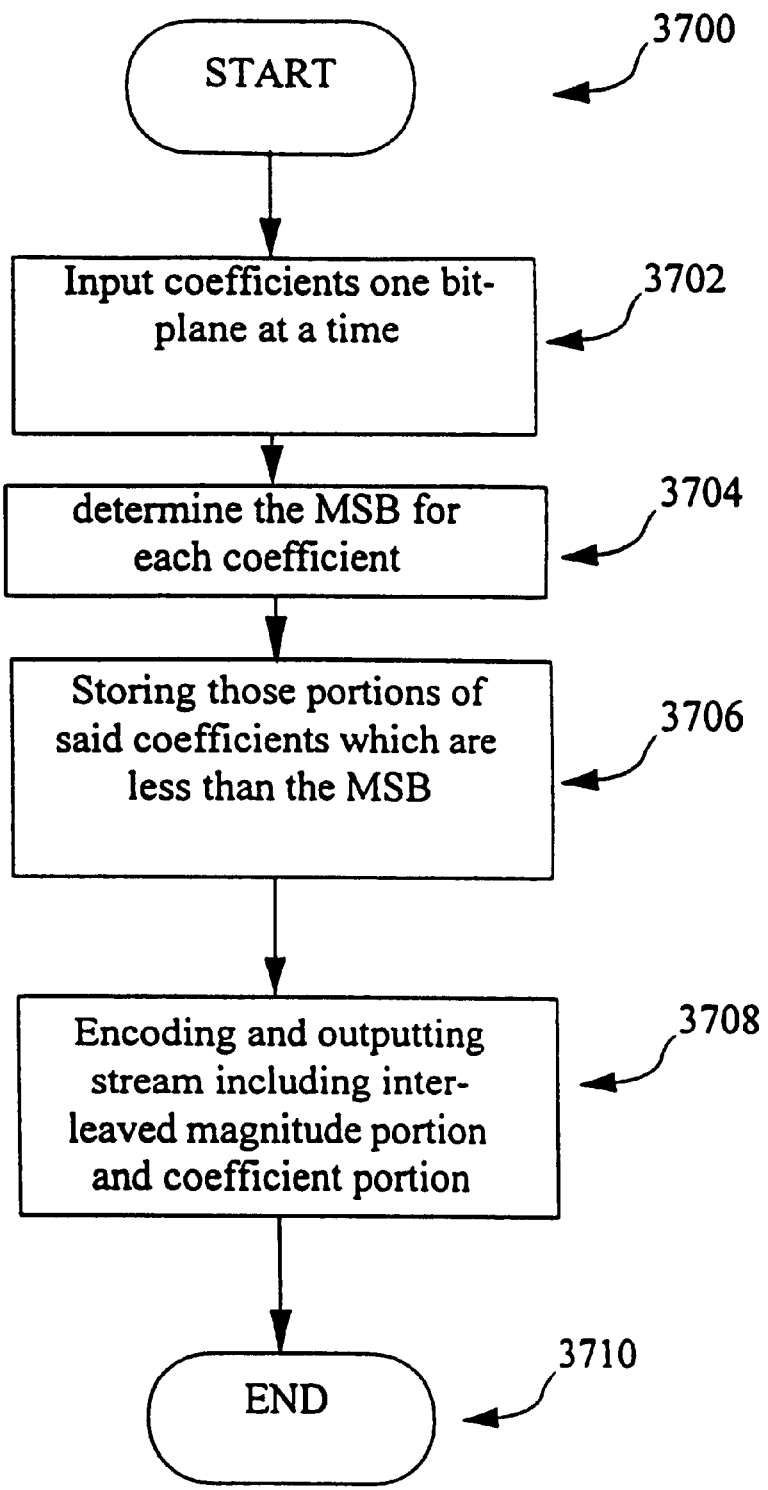
FIG. 37 is a flow diagram of a method for the creation of an encoded bit stream from a series of coefficients in accordance with the third preferred embodiment.

Turning to FIG. 37, there is shown a flow chart of a method of encoding a series of coefficients including a coefficient stream in accordance with a third preferred embodiment of the invention. For ease of explanation, the method is described with reference to a 4×4 array of 8 bit coefficient values. In step 3700, the processing commences and any parameters are initialized. In the next step 3702, the coefficients are input one bitplane at a time and the processing continues at step 3704. In step 3704, the most significant bit value is determined for each coefficient in the region presently being encoded. In the next step 3706, all those portions of the coefficients in the region which are less than the most significant bit are stored. The processing continues at the next step 3708, where a series of zeros and coefficents portions are outputted in the manner described above with reference to FIG. 34. The processing terminates at step 3710.

2.5 Alternate Embodiment of Apparatus(s)

Figure 8:
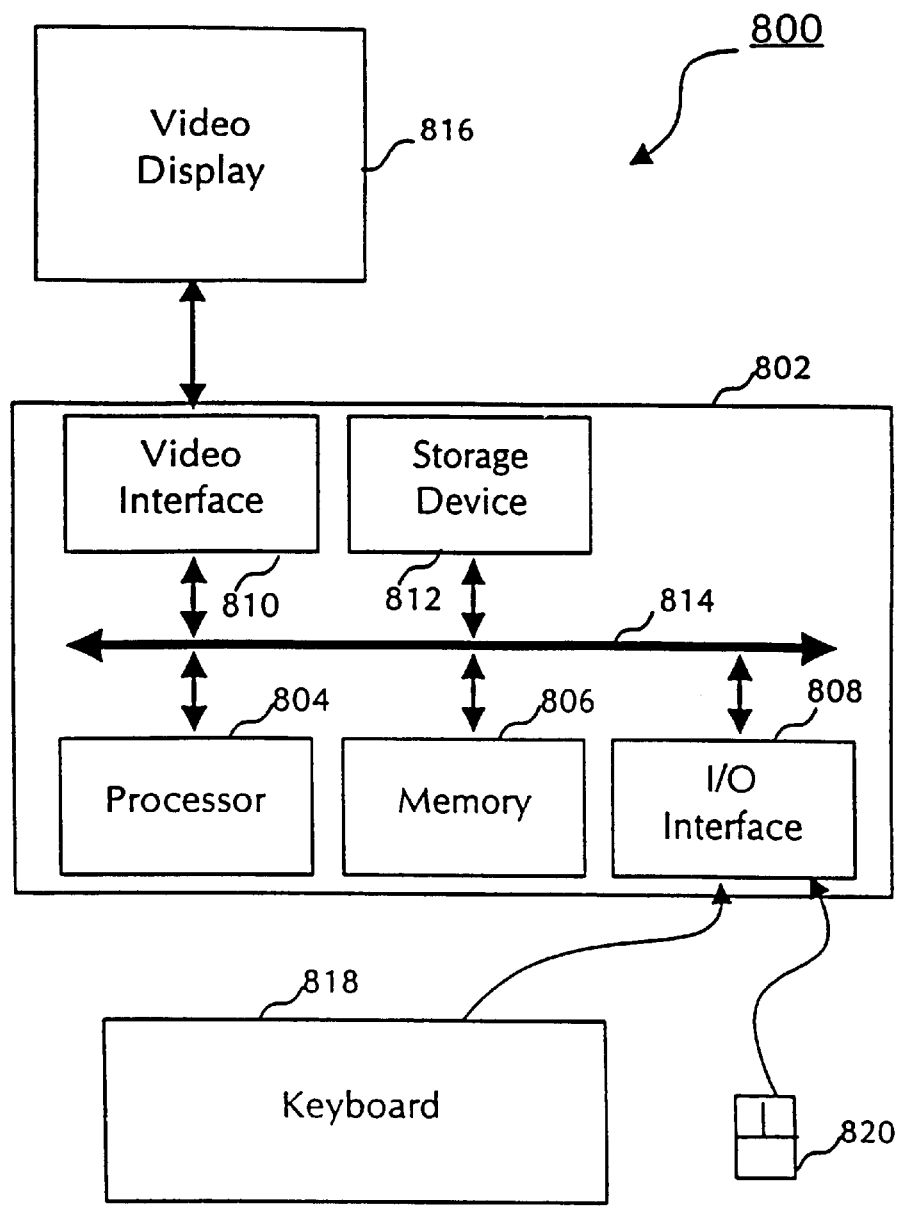
FIG. 8 is a block diagram of a general purpose computer.

Whilst the preferred encoder in accordance with the invention is implemented in dedicated hardware, the encoding processes can also be practiced using a conventional general-purpose computer, such as the one shown in FIG. 8., wherein the processes of FIG. 34, 35, or 36 may be implemented as software executing on the computer. In particular, the steps of the encoding methods are effected by instructions in the software that are carried out by the computer. The software may be divided into two separate parts; one part for carrying out the encoding methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for encoding coded representations of digital images in accordance with the embodiments of the invention.

The computer system 800 consists of the computer 802, a video display 816, and input devices 818, 820. In addition, the computer system 800 can have any of a number of other output devices including line printers, laser printers, plotters, and other reproduction devices connected to the computer 802. The computer system 800 can be connected to one or more other computers via a communication interface 808c using an appropriate communication channel 830 such as a modem communications path, a computer network, or the like. The computer network may include a local area network (LAN), a wide area network (WAN), an Intranet, and/or the Internet The computer 802 itself consists of a central processing unit(s) (simply referred to as a processor hereinafter) 804, a memory 806 which may include random access memory (RAM) and read-only memory (ROM), input/output (IO) interfaces 808a, 808b & 808c, a video interface 810, and one or more storage devices generally represented by a block 812 in FIG. 8. The storage device(s) 812 can consist of one or more of the following: a floppy disc, a hard disc drive, a magneto-optical disc drive, CD-ROM, magnetic tape or any other of a number of non-volatile storage devices well known to those skilled in the art. Each of the components 804 to 812 is typically connected to one or more of the other devices via a bus 814 that in turn can consist of data, address, and control buses.

The video interface 810 is connected to the video display 816 and provides video signals from the computer 802 for display on the video display 816. User input to operate the computer 802 can be provided by one or more input devices 808b. For example, an operator can use the keyboard 818 and/or a pointing device such as the mouse 820 to provide input to the computer 802.

The system 800 is simply provided for illustrative purposes and other configurations can be employed without departing from the scope and spirit of the invention. Exemplary computers on which the embodiment can be practiced include IBM-PC/ATs or compatibles, one of the Macintosh (TM) family of PCs, Sun Sparcstation (TM), or the like. The foregoing is merely exemplary of the types of computers with which the embodiments of the invention may be practiced. Typically, the processes of the embodiments, described hereinafter, are resident as software or a program recorded on a hard disk drive (generally depicted as block 812 in FIG. 8) as the computer readable medium, and read and controlled using the processor 804. Intermediate storage of the program and pixel data and any data fetched from the network may be accomplished using the semiconductor memory 806, possibly in concert with the hard disk drive 812.

In some instances, the program may be supplied to the user encoded on a CD-ROM or a floppy disk (both generally depicted by block 812), or alternatively could be read by the user from the network via a modem device connected to the computer, for example. Still further, the software can also be loaded into the computer system 800 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The foregoing only describes a small number of embodiments of the present invention, however, modifications and/or changes can be made thereto by a person skilled in the art without departing from the scope and spirit of the invention. The present embodiments are, therefore, to be considered in all respects to be illustrative and not restrictive.

What is claimed is:

1. An apparatus for encoding a block of coefficients to provide a coded representation of said coefficients, wherein said block of coefficients is partitioned into a plurality of groups of said coefficients, said apparatus comprising:

a tree building circuit for constructing a tree representation of said coefficients, wherein said tree representation comprises a plurality of internal nodes and a plurality of leaf nodes, the leaf nodes of a corresponding said internal node representing respective values of coefficients of a corresponding said group of coefficients, and each internal node having a number associated therewith representing the maximum number of a number indicating the number of digits required to represent the largest coefficient of the coefficients of any leaf nodes immediately descendant therefrom and said numbers associated with any internal nodes immediately descendant therefrom; and a tree coding circuit for coding said constructed tree representation to produce a stream of data comprising said coded representation of said coefficients.

2. An apparatus as claimed in claim 1, wherein said apparatus further comprises:

a tree buffer interconnecting said tree building circuit and said tree coding circuit for storing said tree representation.

3. An apparatus as claimed in claim 2, wherein said tree buffer is adapted to store at least two tree representations and said tree building circuit is adapted to form a first of said two representations while said tree coding circuit is adapted to read a second of said two tree representations previously created by said tree building circuit.

4. An apparatus as claimed in claim 1, wherein said coefficients comprise wavelet coefficients.

5. A method of encoding a block of coefficients to provide a coded representation of said coefficients, wherein said block of coefficients is partitioned into a plurality of groups of said coefficients, said method comprising:

constructing a tree representation of said coefficients, wherein said tree representation comprises a plurality of internal nodes and a plurality of leaf nodes, the leaf nodes of a corresponding said internal node representing respective values of coefficients of a corresponding said group of coefficients, and each internal node having a number associated therewith representing the maximum number of a number indicating the number of digits required to represent the largest coefficient of the coefficients of any leaf nodes immediately descendant therefrom and said numbers associated with any internal nodes immediately descendant therefrom; and coding said constructed tree representation to produce a stream of data comprising said coded representation of said coefficients.

6. A method as claimed in claim 5, wherein said construction step comprises constructing said tree in a depth first order from a deepest leaf node.

7. A method as claimed in claim 5, wherein said coding step comprises coding said tree representation in a breath first order to produce said data stream.

8. A method as claimed in claim 5, wherein said construction step comprises:

traversing in sequence said plurality of groups;

storing, for each group, the coefficient values of the group in respective said leaf nodes; and determining, for each internal node, the maximum number of a number indicating the number of digits required to represent the largest coefficient of the coefficients of any leaf nodes immediately descendant therefrom and said numbers associated with any internal nodes immediately descendant therefrom and storing such maximum number in said internal node.

9. A computer program product including a computer readable medium having recorded thereon a computer program for encoding a block of coefficients to provide a coded representation of said coefficients, wherein said block of coefficients is partitioned into a plurality of groups of said coefficients, said computer program product comprising:

tree building means for constructing a tree representation of said coefficients, wherein said tree representation comprises a plurality of internal nodes and a plurality of leaf nodes, the leaf nodes of a corresponding said internal node representing respective values of coefficients of a corresponding said group of coefficients, and each internal node having a number associated therewith representing the maximum number of a number indicating the number of digits required to represent the largest coefficient of the coefficients of any leaf nodes immediately descendant therefrom and said numbers associated with any internal nodes immediately descendant therefrom; and tree coding means for coding said constructed tree representation to produce a stream of data comprising said coded representation of said coefficients.

10. A computer program product as claimed in claim 9, wherein said tree building means comprises means for constructing said tree in a depth first order from a deepest leaf node.

11. A computer program product as claimed in claim 9, wherein said tree coding means comprises means for coding said tree representation in a breath first order to produce said data stream.

12. A computer program product as claimed in claim 9, wherein said tree building means comprises:

traversal means for traversing in sequence said plurality of groups;

means for storing, for each group, the coefficient values of the group in respective said leaf nodes; and means for determining, for each internal node, the maximum number of a number indicating the number of digits required to represent the largest coefficient of the coefficients of any leaf nodes immediately descendant therefrom and said numbers associated with any internal nodes immediately descendant therefrom and storing such maximum number in said internal node.

13. An apparatus for the creation of an encoded bit stream from a block of coefficients, wherein said block of coefficients is partitioned into a plurality of groups of said coefficients, the apparatus comprising:

bit plane splitting means for splitting said block of coefficients as a plurality of bitplanes;

a plurality of bit data validity units connected to one another and connected to said bit plane splitting means for receiving and processing respective said bitplanes, wherein each said bit data validity unit outputs signals indicating whether or not respective portions of its received bitplane corresponding to respective said groups of coefficients comprise coefficients having a significant bit greater than or equal to its received bitplane; and a packing logic circuit adapted to pack said coefficients into a contiguous bit stream utilizing said outputs of said bit data validity units.

14. An apparatus as claimed in claim 13, wherein said coefficients comprise a wavelet decomposition of data and said groups include sub-bands of said wavelet decomposition.

15. An apparatus as claimed in claim 13, wherein said packing logic circuit further comprises:

packing circuits for packing respective said groups of coefficients into packed groups;

a start address extraction circuit for extracting a start address within each of said groups; and a combiner circuit interconnected to said packing circuits and said start address extraction circuit and adapted to pack said packed groups into said continuous bit stream.

16. A method for the creation of an encoded bit stream from a block of coefficients, wherein said block of coefficients comprises a plurality of groups of said coefficients, the method comprising the steps of:

inputting said block of coefficients;

splitting said block of coefficients into a predetermined number of bitplanes;

outputting signals, for each said bitplane, indicating whether or not respective portions of the bitplane corresponding to respective said groups of coefficients comprise coefficients having a significant bit greater than or equal to the bitplane; and packing said block of coefficients into an encoded bit stream using said bitplanes and said output signals.

17. A method as claimed in claim 16, wherein said coefficients comprise a wavelet decomposition of data and said groups include sub-bands of said wavelet decomposition.

18. A method as claimed in claim 16, wherein said packing step further comprises:

packing said groups into packed groups;

extracting a start address within each of said groups; and combining said packed groups to produce said encoded bit stream.

19. A computer program product including a computer readable medium having recorded thereon a computer program for the creation of an encoded bit stream from a block of coefficients, wherein said block of coefficients comprises a plurality of groups of said coefficients, the computer program product comprising:

input means for inputting said block of coefficients;

splitting means for splitting said block of coefficients into a predetermined number of bitplanes;

output means for outputting signals, for each said bitplane, indicating whether or not respective portions of the bitplane corresponding to respective said groups of coefficients comprise coefficients having a significant bit greater than or equal to the bitplane; and packing means for packing said block of coefficients into an encoded bit stream using said bitplanes and said output signals.

20. A computer program product as claimed in claim 19, wherein said coefficients comprise a wavelet decomposition of data and said groups include sub-bands of said wavelet decomposition.

21. A computer program product as claimed in claim 19, wherein said packing means comprises:

packing means for packing said groups into packed groups;

extraction means for extracting a start address within each of said groups; and combination means for combining said packed groups to produce said encoded bit stream.

22. A method for the creation of an encoded bit stream from a block of coefficients, each of said coefficients being represented by a predetermined number of bits, said method comprising the steps of:

inputting said coefficients, a bit plane at a time;

determining from said bit planes a most significant bit of each of said coefficients;

storing those portions of said coefficients which are less than the most significant bit; and utilizing said most significant bit determination and said portions of said coefficients to encode a decodable interleaved compact form of said coefficient stream comprising an interleaved coefficient magnitude portion stream and a coefficient portion stream.

23. An apparatus for encoding a block of coefficients, the apparatus comprising:

input means for simultaneously inputting said block of coefficients, one bit plane at a time;

a bit plane magnitude determination circuit connected to said input means for determining and storing a most significant bit of each of said coefficients;

a coefficient storage connected to said input means for storing the lesser significant coefficients of said coefficients; and a pixel packer circuit connected to said bit plane magnitude determination circuit and said coefficient storage and adapted to read values and to produce a decodable interleaved compact form of said coefficient stream comprising an interleaved coefficient magnitude portion stream and a coefficient portion stream.

24. A computer program product including a computer readable medium having recorded thereon a computer program for encoding a block of coefficients, each of said coefficients being represented by a predetermined number of bits, said computer program product comprising:

input means for inputting said coefficients, a bit plane at a time;

determination means for determining from said bit planes a most significant bit of each of said coefficients;

storage means for storing those portions of said coefficients which are less than the most significant bit; and encoding means utilizing said most significant bit determination and said portions of said coefficients to encode a decodable interleaved compact form of said coefficient stream comprising an interleaved coefficient magnitude portion stream and a coefficient portion stream.

* * * * *

UNITED STATES PATENT AND TRADEMARK OFFICE
CERTIFICATE OF CORRECTION

PATENT NO. : 6,266,450 B1
DATED : July 24, 2001
INVENTOR(S) : Dominic Yip et al.

It is certified that error appears in the above-identified patent and that said Letters Patent is hereby corrected as shown below:

<u>Column 1,</u>
Line 42, "an" should read -- a --.

<u>Column 3,</u>
Line 20, "stream." should read -- stream --.

<u>Column 7,</u>
Line 6, "that" (second occurrence) should read -- than --; and
Line 43, "may" should read -- may be --.

<u>Column 9,</u>
Line 9, "block 64" should read -- block 604 --;
Line 10, "then" should read -- than --;
Line 14, "block 68." should read -- block 608. --;
Line 27, "block 64." should read -- block 604. --;
Line 50, close up right margin; and
Line 51, close up left margin.

<u>Column 10,</u>
Line 67, close up right margin.

<u>Column 11,</u>
Line 1, close up left margin.

<u>Column 15,</u>
Line 54, close up right margin; and
Line 55, close up left margin.

<u>Column 18,</u>
Line 6, "an" should read -- a --.

<u>Column 19,</u>
Line 8, "require" should read -- required --.

<u>Column 20,</u>
Line 43, "Adata$_{13}$packed" should read -- Adata_packed --.

UNITED STATES PATENT AND TRADEMARK OFFICE
CERTIFICATE OF CORRECTION

PATENT NO. : 6,266,450 B1
DATED : July 24, 2001
INVENTOR(S) : Dominic Yip et al.

It is certified that error appears in the above-identified patent and that said Letters Patent is hereby corrected as shown below:

Column 21,
Line 13, "3$^{th}$," should read -- 3$^{rd}$, --; and
Line 16, "outtputted." should read -- outputted. --.

Column 22,
Line 31, "dimension of the block be" should read -- dimensions of the block are --;
Line 32, "pixel. It" should read -- pixel, it --; and
Line 56, "reconfigure" should read -- reconfigured --.

Signed and Sealed this

Twentieth Day of May, 2003

JAMES E. ROGAN
*Director of the United States Patent and Trademark Office*